US012724154B2

(12) United States Patent
Kurokawa

(10) Patent No.: US 12,724,154 B2
(45) Date of Patent: Sep. 1, 2026

(54) CONTROL APPARATUS AND CONTROL METHOD

(71) Applicant: SONY SEMICONDUCTOR SOLUTIONS CORPORATION, Kanagawa (JP)

(72) Inventor: Tsubasa Kurokawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 53 days.

(21) Appl. No.: 18/847,944

(22) PCT Filed: Mar. 15, 2023

(86) PCT No.: PCT/JP2023/010024
§ 371 (c)(1),
(2) Date: Sep. 17, 2024

(87) PCT Pub. No.: WO2023/182089
PCT Pub. Date: Sep. 28, 2023

(65) Prior Publication Data

US 2025/0052903 A1 Feb. 13, 2025

(30) Foreign Application Priority Data

Mar. 24, 2022 (JP) ................................ 2022-048085

(51) Int. Cl.
*G01S 17/894* (2020.01)
*G01C 7/04* (2006.01)
(Continued)

(52) U.S. Cl.
CPC .............. *G01S 17/894* (2020.01); *G01C 7/04* (2013.01); *G01S 17/89* (2013.01); *G06T 7/50* (2017.01);
(Continued)

(58) Field of Classification Search
CPC ......... G01C 7/04; G01S 17/89; G01S 17/894; G06T 2207/10028; G06T 2207/10032
See application file for complete search history.

(56) References Cited

U.S. PATENT DOCUMENTS

2017/0205826 A1* 7/2017 Smith .................. G05D 1/0094
2021/0192764 A1* 6/2021 Liu ........................ G06T 7/136

FOREIGN PATENT DOCUMENTS

JP 2010-095246 A 4/2010
JP 2019-214294 A 12/2019
(Continued)

OTHER PUBLICATIONS

Al-Rawabdeh, Abdulla et al. "Time Series UAV Image-Based Point Clouds for Landslide Progression Evaluation Applications". Sensors 2017, 17(10), 2378, Oct. 18, 2017. (Year: 2017).*
(Continued)

*Primary Examiner* — Michael A Lyons
(74) *Attorney, Agent, or Firm* — CHIP LAW GROUP

(57) ABSTRACT

Accuracy of three-dimensional surveying is increased in a case where a zone to be surveyed includes a slope. A control apparatus according to the present technology includes a point cloud generation section that generates a three-dimensional point cloud indicating a three-dimensional structure of a target zone on the basis of sensing information obtained by sensing a ground side from the air, an estimation section that estimates an orientation of the ground on the basis of a captured image obtained by imaging the ground side from the air, and a control section that performs control related to sensing for generation of the three-dimensional point cloud of the target zone on the basis of information regarding the orientation of the ground estimated by the estimation section.

15 Claims, 19 Drawing Sheets

(51) Int. Cl.
*G01S 17/89* (2020.01)
*G06T 7/50* (2017.01)
*G06T 7/70* (2017.01)

(52) U.S. Cl.
CPC ...... *G06T 7/70* (2017.01); *G06T 2207/10028* (2013.01); *G06T 2207/10032* (2013.01)

(56) References Cited

FOREIGN PATENT DOCUMENTS

| | | | | |
|---|---|---|---|---|
| JP | 2020-043543 A | 3/2020 | | |
| JP | 6674822 B2 * | 4/2020 | ............... | G06T 1/00 |
| JP | 2021-039726 A | 3/2021 | | |
| WO | WO-2020119572 A1 * | 6/2020 | ............... | G06T 7/00 |
| WO | 2020/262060 A1 | 12/2020 | | |

OTHER PUBLICATIONS

English translation of JP2020043543. Obtained from Espacenet on Mar. 6, 2026. (Year: 2026).*

International Search Report and Written Opinion of PCT Application No. PCT/JP2023/010024, issued on May 9, 2023, 10 pages of ISRWO.

* cited by examiner

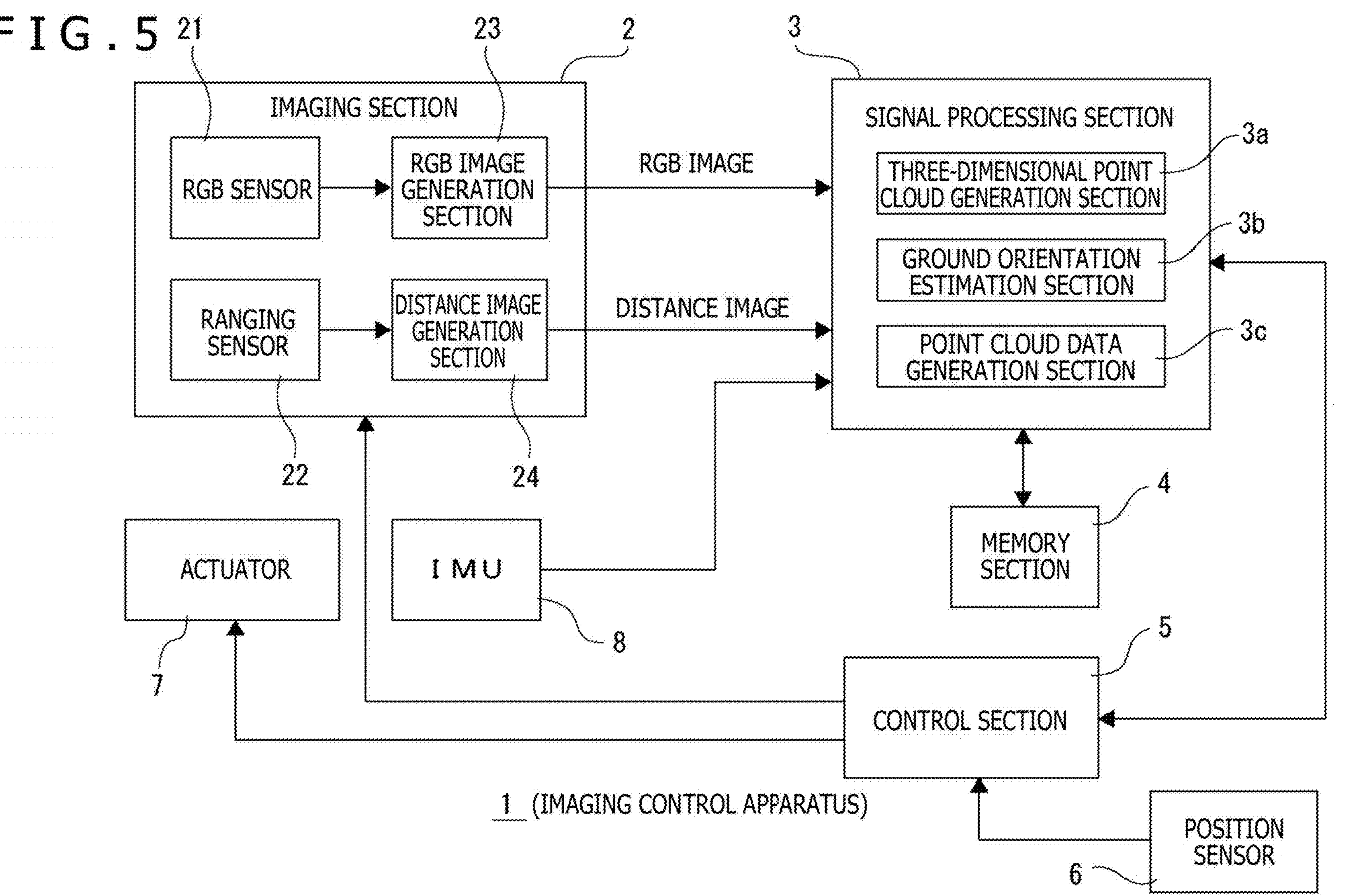
FIG. 5
21
23
2
3
IMAGING SECTION
RGB SENSOR
RGB IMAGE GENERATION SECTION
RANGING SENSOR
DISTANCE IMAGE GENERATION SECTION
22
24
RGB IMAGE
DISTANCE IMAGE
SIGNAL PROCESSING SECTION
THREE-DIMENSIONAL POINT CLOUD GENERATION SECTION
GROUND ORIENTATION ESTIMATION SECTION
POINT CLOUD DATA GENERATION SECTION
3a
3b
3c
MEMORY SECTION
4
ACTUATOR
7
IMU
8
CONTROL SECTION
5
1 (IMAGING CONTROL APPARATUS)
POSITION SENSOR
6

THREE-DIMENSIONAL POINT CLOUD
GROUND ORIENTATION ESTIMATION SECTION
3b
NORMAL VECTOR COMPUTATION SECTION
31
ANGLE IMAGE GENERATION SECTION
32
BINARIZATION PROCESSING SECTION
33
MASK SECTION
34
REPRESENTATIVE ANGLE COMPUTATION SECTION
35
REPRESENTATIVE ANGLE $$A_{cam} \cdot h_{cam} = \cos\theta \cdots (1)$$
$$\theta = \cos^{-1}[A_{cam} \cdot h_{cam}]$$

(1) FOR BOTH A AND y, NORM 1, AND $h_{cam}$ CORRESPONDS TO VERTICAL VECTOR IN CAMERA COORDINATE SYSTEM

ANGLE IMAGE
90°
0°
BINARIZATION

BINARIZED IMAGE
REMOVE SMALL REGIONS

MASK IMAGE
EXTRACT REPRESENTATIVE POINT

MASK IMAGE
REPRESENTATIVE POINT
θ
ANGLE IMAGE
REPRESENTATIVE ANGLE 21
23
2
3
RGB SENSOR
RGB IMAGE GENERATION SECTION
RANGING SENSOR
DISTANCE IMAGE GENERATION SECTION
22
24
RGB IMAGE
DISTANCE IMAGE
SIGNAL PROCESSING SECTION
3a
THREE-DIMENSIONAL POINT CLOUD GENERATION SECTION
3b
GROUND ORIENTATION ESTIMATION SECTION
3c
POINT CLOUD DATA GENERATION SECTION
4
MEMORY SECTION
ACTUATOR
7
IMU
8
5A
CONTROL SECTION
1A
POSITION SENSOR
6

FIG. 13

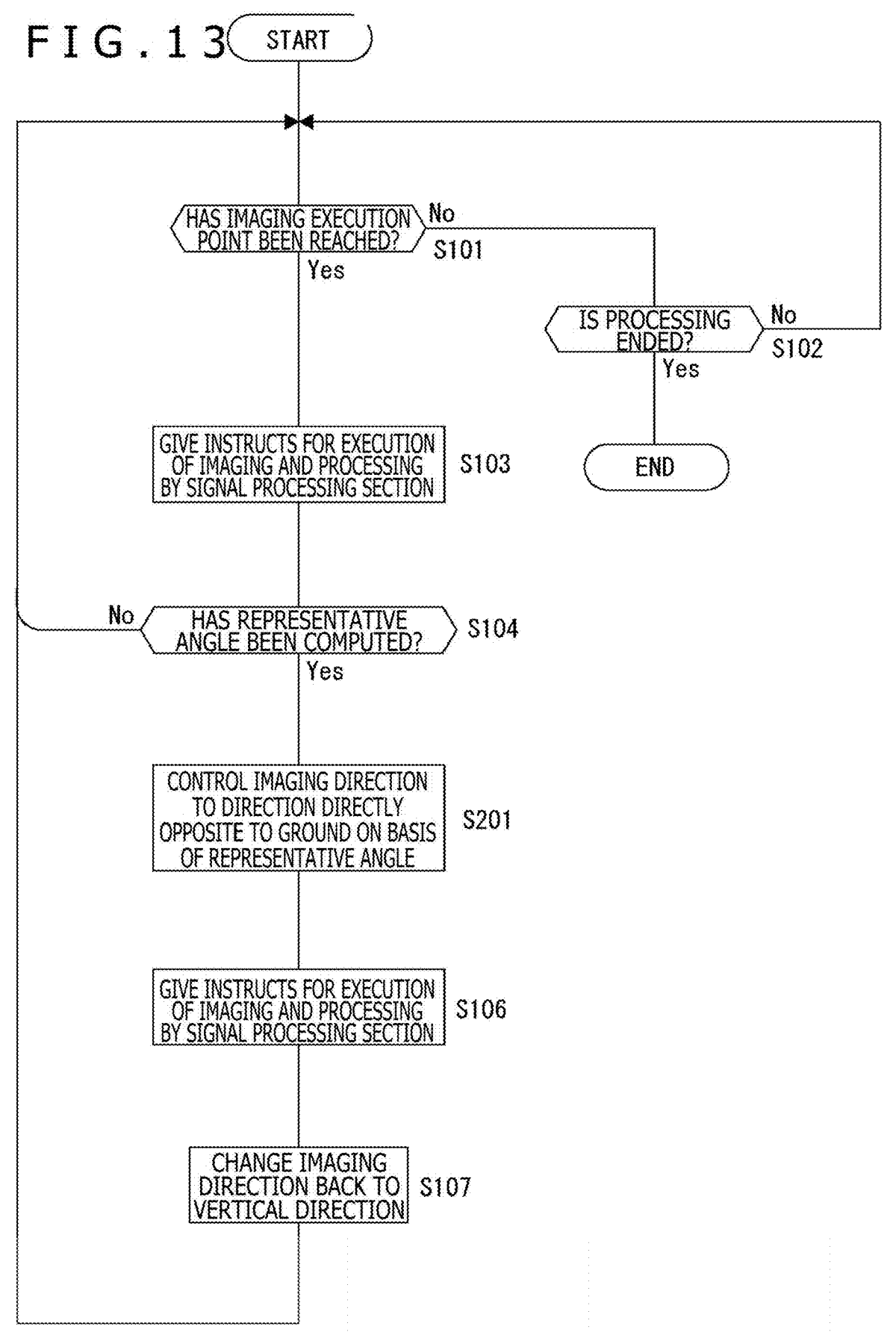

START

HAS IMAGING EXECUTION POINT BEEN REACHED? S101

No

IS PROCESSING ENDED? S102

No

Yes

END

Yes

GIVE INSTRUCTS FOR EXECUTION OF IMAGING AND PROCESSING BY SIGNAL PROCESSING SECTION S103

HAS REPRESENTATIVE ANGLE BEEN COMPUTED? S104

No

Yes

CONTROL IMAGING DIRECTION TO DIRECTION DIRECTLY OPPOSITE TO GROUND ON BASIS OF REPRESENTATIVE ANGLE S201

GIVE INSTRUCTS FOR EXECUTION OF IMAGING AND PROCESSING BY SIGNAL PROCESSING SECTION S106

CHANGE IMAGING DIRECTION BACK TO VERTICAL DIRECTION S107

RGB SENSOR
21
RANGING SENSOR
22
RGB IMAGE GENERATION SECTION
23
DISTANCE IMAGE GENERATION SECTION
24
2
RGB IMAGE
DISTANCE IMAGE
IMU
8
1B
SIGNAL PROCESSING SECTION
3
THREE-DIMENSIONAL POINT CLOUD GENERATION SECTION
3a
GROUND ORIENTATION ESTIMATION SECTION
3b
POINT CLOUD DATA GENERATION SECTION
3c
MEMORY SECTION
4
CONTROL SECTION
5B
POSITION SENSOR
6
COMMUNICATION SECTION
9

21
23
2
3C
RGB SENSOR
RGB IMAGE GENERATION SECTION
RGB IMAGE
SIGNAL PROCESSING SECTION
THREE-DIMENSIONAL POINT CLOUD GENERATION SECTION
3a
RANGING SENSOR
DISTANCE IMAGE GENERATION SECTION
DISTANCE IMAGE
POINT CLOUD DATA GENERATION SECTION
3c
22
24
4
MEMORY SECTION
ACTUATOR
7
5C
CONTROL SECTION
1C
POSITION SENSOR
6
COMMUNICATION SECTION
9

PROCESSING BY PRECEDING APPARATUS

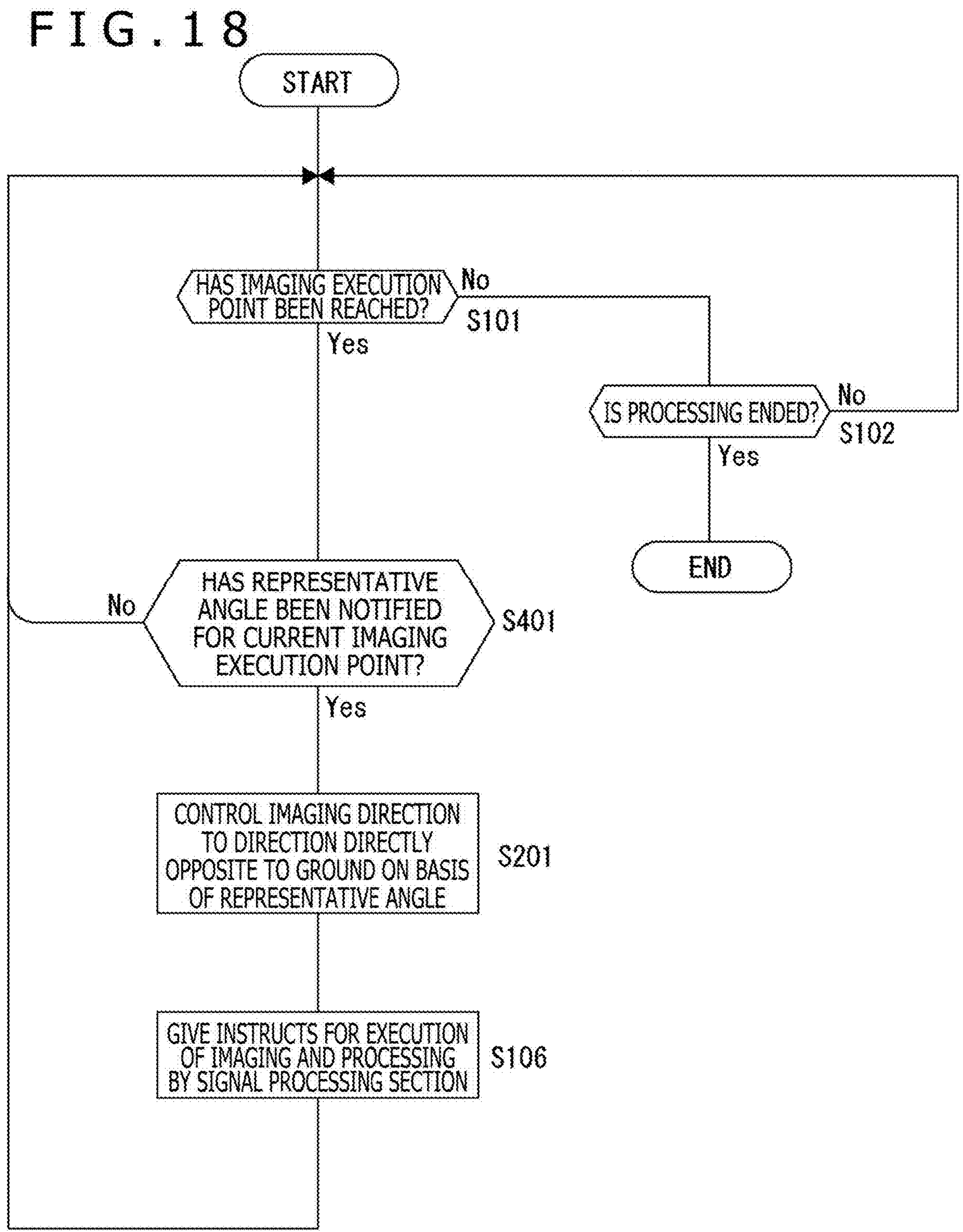
PROCESSING BY FOLLOWING APPARATUS

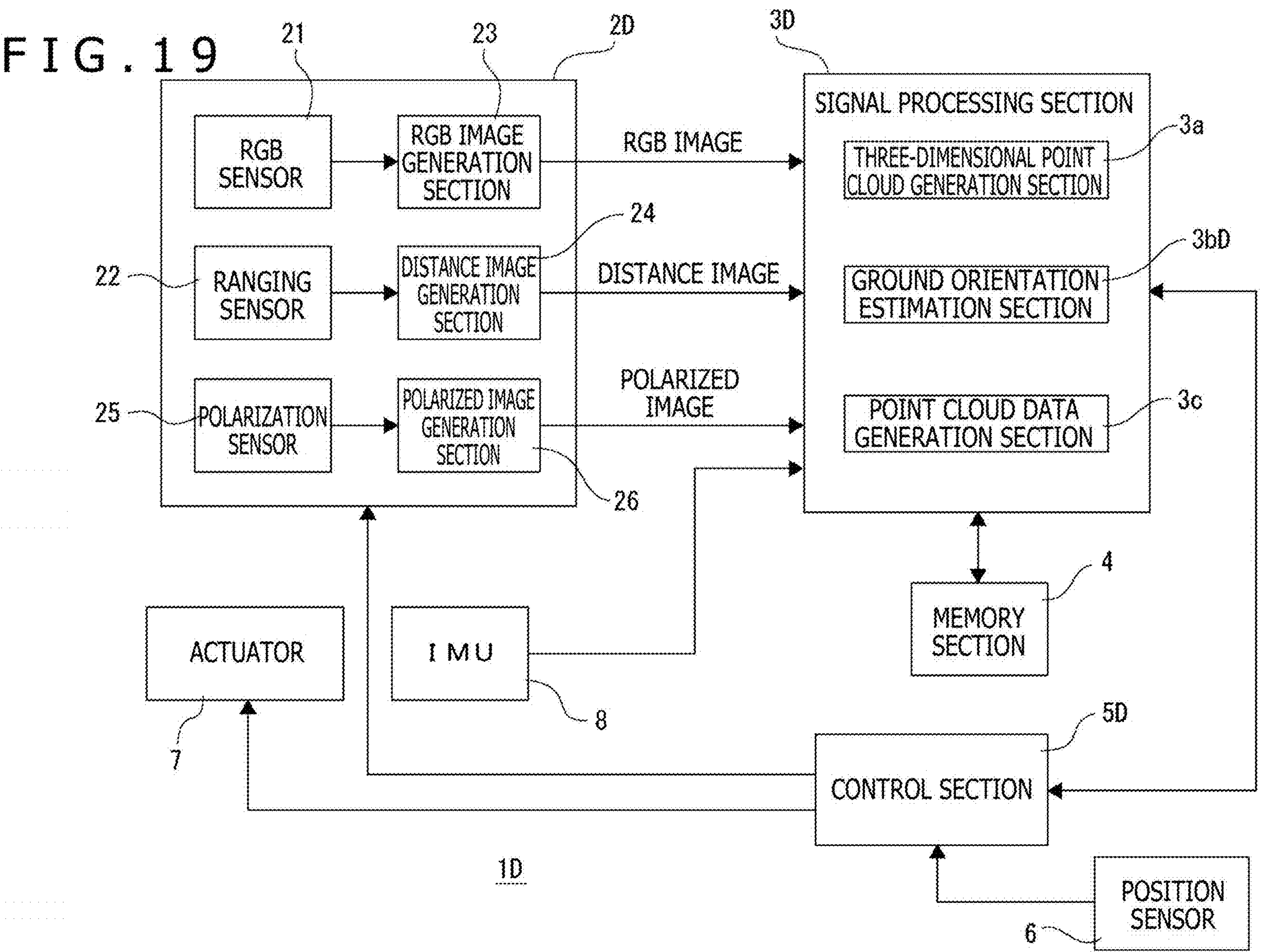
FIG. 19
21
23
2D
3D
RGB SENSOR
RGB IMAGE GENERATION SECTION
RGB IMAGE
SIGNAL PROCESSING SECTION
THREE-DIMENSIONAL POINT CLOUD GENERATION SECTION
3a
24
22
RANGING SENSOR
DISTANCE IMAGE GENERATION SECTION
DISTANCE IMAGE
GROUND ORIENTATION ESTIMATION SECTION
3bD
25
POLARIZATION SENSOR
POLARIZED IMAGE GENERATION SECTION
POLARIZED IMAGE
POINT CLOUD DATA GENERATION SECTION
3c
26
MEMORY SECTION
4
ACTUATOR
IMU
8
7
CONTROL SECTION
5D
1D
POSITION SENSOR
6

FIG. 20

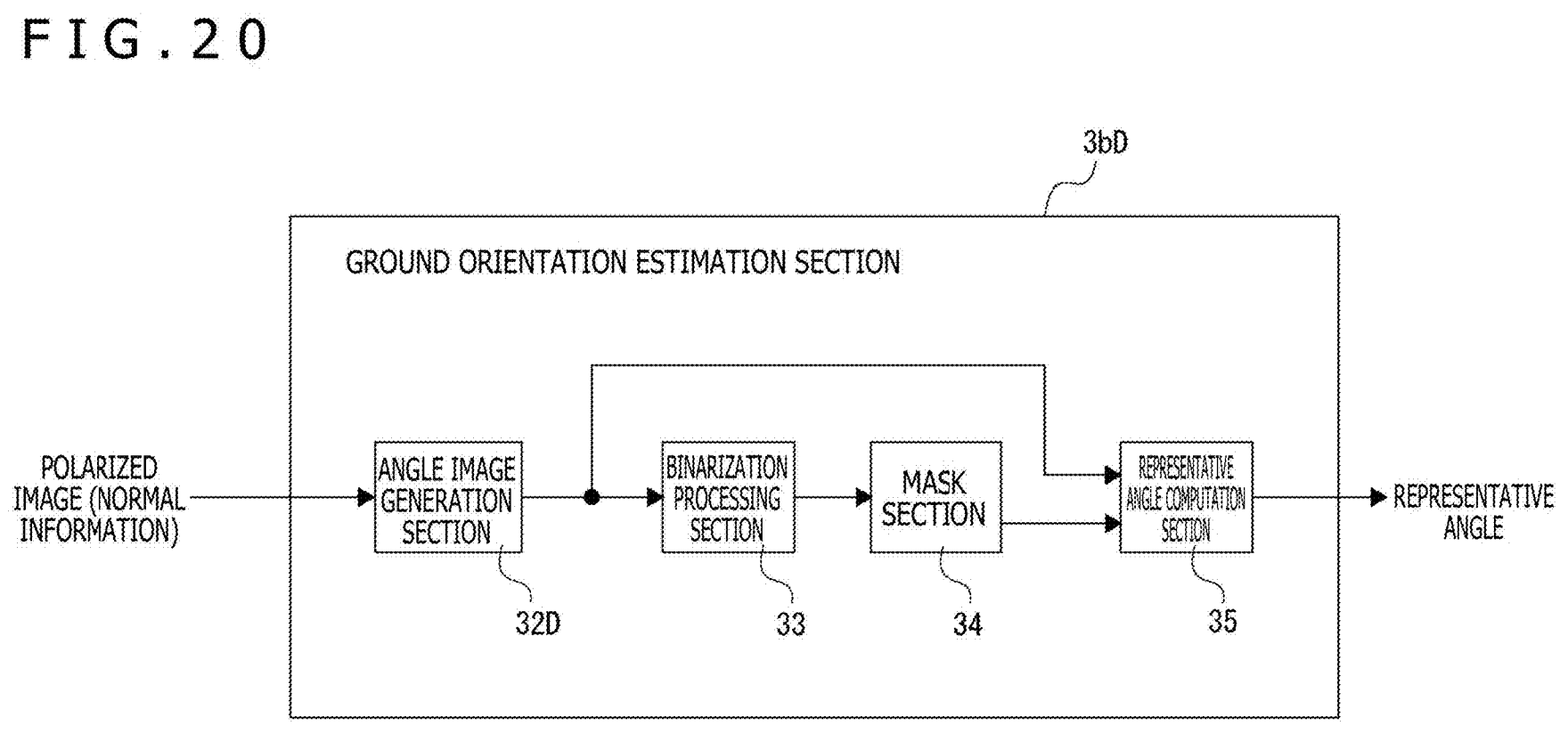

POLARIZED IMAGE (NORMAL INFORMATION)

3bD

GROUND ORIENTATION ESTIMATION SECTION

ANGLE IMAGE GENERATION SECTION

32D

BINARIZATION PROCESSING SECTION

33

MASK SECTION

34

REPRESENTATIVE ANGLE COMPUTATION SECTION

35

REPRESENTATIVE ANGLE

CONTROL APPARATUS AND CONTROL METHOD

CROSS REFERENCE TO RELATED APPLICATIONS

This application is a U.S. National Phase of International Patent Application No. PCT/JP2023/010024 filed on Mar. 15, 2023, which claims priority benefit of Japanese Patent Application No. JP 2022-048085 filed in the Japan Patent Office on Mar. 24, 2022. Each of the above-referenced applications is hereby incorporated herein by reference in its entirety.

TECHNICAL FIELD

The present technology relates to a control apparatus and a method for the control apparatus, and in particular, to a control technology for sensing in a case where a target zone is three-dimensionally surveyed on the basis of sensing information obtained by sensing a ground side from the air.

BACKGROUND ART

For example, in a technology for realizing three-dimensional surveying of a target zone, a three-dimensional point cloud indicating a three-dimensional structure of the target zone is generated on the basis of sensing information obtained by sensing the ground side from the air with use of a flying body of a drone (see, for example, PTL 1).

PTL 1 discloses that a three-dimensional point cloud is generated on the basis of images of the surface of the ground captured by a laser ranging sensor mounted in the flying body (capturing images is hereinafter referred to as "imaging").

Further, PTL 1 discloses a technology in which, on the premise that each of areas in the target zone is imaged at a certain flying altitude, a three-dimensional point cloud can be generated with the minimum number of captured images needed, by controlling imaging intervals according to the altitude above ground level to keep the degree of overlap/sidelap among captured images constant.

CITATION LIST

Patent Literature

[PTL 1]
Japanese Patent Laid-Open No. 2019-214294

SUMMARY

Technical Problem

Here, as also illustrated in PTL 1 described above, in the three-dimensional surveying, the ground side is imaged with an imaging direction (sensing direction) from the air set as a direction vertical to a horizontal surface.

However, the ground to be surveyed may include the ground as a slope with a continuously varying ground altitude. When imaging in the vertical direction as described above is performed on such a ground as a slope, the ground in the captured image tends to have a reduced area, with the number of samples in the point cloud reduced.

In view of the circumstances described above, an object of the present technology is to increase accuracy of three-dimensional surveying in a case where a zone to be surveyed includes a slope.

Solution to Problem

A control apparatus according to the present technology includes a point cloud generation section that generates a three-dimensional point cloud indicating a three-dimensional structure of a target zone on the basis of sensing information obtained by sensing a ground side from the air, an estimation section that estimates an orientation of the ground on the basis of a captured image obtained by imaging the ground side from the air, and a control section that performs control related to sensing for generation of the three-dimensional point cloud of the target zone on the basis of information regarding the orientation of the ground estimated by the estimation section.

Thus, when the three-dimensional point cloud of the target zone is to be generated on the basis of the sensing information targeting the ground, appropriate sensing control corresponding to the orientation of the ground can be performed, for example, sensing is performed in the orientation aligned with the orientation of the ground.

In addition, a control method according to the present technology is a control method executed by a signal processing apparatus, the method including processing of generating a three-dimensional point cloud indicating a three-dimensional structure of a target zone on the basis of sensing information obtained by sensing a ground side from the air, estimating an orientation of the ground on the basis of a captured image obtained by imaging the ground side from the air, and performing control related to sensing for generation of the three-dimensional point cloud of the target zone on the basis of information regarding the estimated orientation of the ground.

Such a control method also produces effects similar to those exerted by the control apparatus according to the present technology described above.

BRIEF DESCRIPTION OF DRAWINGS

FIG. 5 is a block diagram illustrating a configuration example of a control apparatus as the first embodiment.

FIG. 13 is a flowchart illustrating an example of a processing procedure for implementing a three-dimensional surveying technique as the second embodiment.

FIG. 18 is a flowchart illustrating an example of a processing procedure for implementing processing as the following apparatus in the third embodiment.

FIG. 19 is a block diagram illustrating a configuration example of a control apparatus as a variation.

FIG. 20 is a block diagram illustrating a configuration example of a ground orientation estimation section included in the control apparatus as the variation.

DESCRIPTION OF EMBODIMENTS

With reference to the drawings, embodiments according to the present technology will hereinafter be described in the following order.

<1. First Embodiment>
(1-1. Overview of System)
(1-2. Configuration of Control Apparatus)
(1-3. Processing Procedure)
<2. Second Embodiment>
<3. Third Embodiment>
<4. Variation>
<5. Conclusion of Embodiments>
<6. Present Technology>

1. First Embodiment (1-1. Overview of System)

Figure 1:
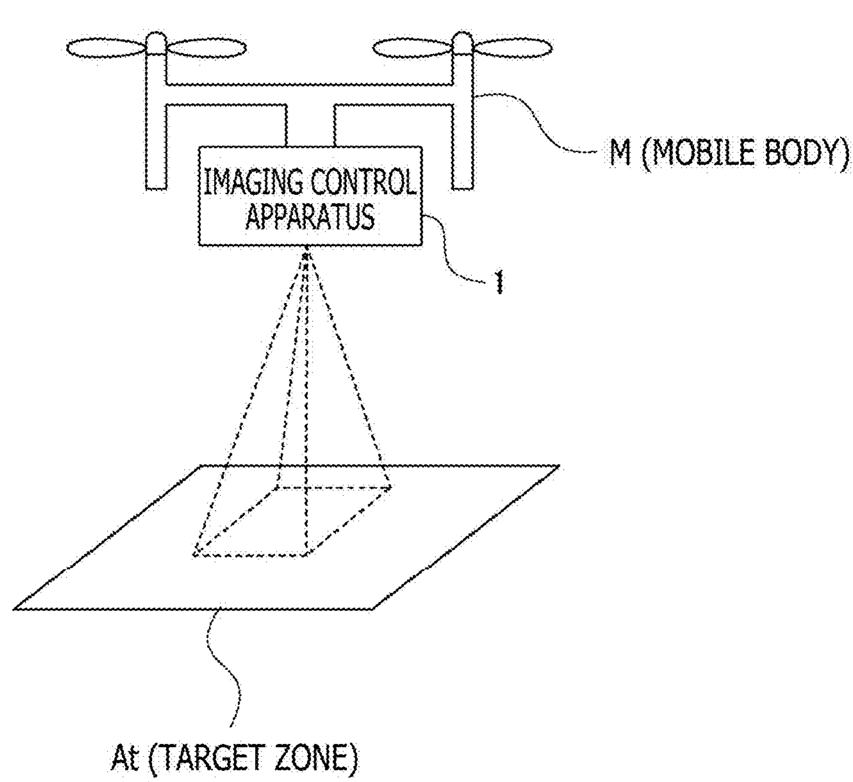
FIG. 1 is a diagram illustrating an overview of a configuration of a surveying system as an embodiment according to the present technology.

FIG. 1 is a diagram illustrating an overview of a configuration of a surveying system as an embodiment according to the present technology.

As illustrated in the figure, the surveying system as an embodiment includes at least an imaging control apparatus 1 and a mobile body M.

The imaging control apparatus 1 is configured as a computer apparatus including an imaging section that obtains captured images (imaging section 2 described below), a CPU (Central Processing Unit), a ROM (Read Only Memory), a RAM (Random Access Memory), and the like.

Here, "imaging" as used herein means that sensing is performed by a sensor including pixels two-dimensionally arranged, each pixel including a light receiving element. Additionally, a "captured image" means an image obtained by sensing performed by such a sensor, that is, an image indicating, for each pixel, information based on a light receiving signal.

In the first embodiment, the imaging section described above is provided with an RGB sensor that obtains RGB images (RGB sensor 21 described below) and a ranging sensor that obtains distance images ("ranging sensor 22" described below). An RGB image means an image (color image) indicating, for each pixel, an R (red) illuminance value, a G (green) illuminance value, and a B (blue) illuminance value. A distance image means an image indicating, for each pixel, information regarding a distance to a subject.

The mobile body M broadly means an object that can move with the imaging control apparatus 1 mounted (supported) thereon. In the present example, the mobile body M is a flying body, for example, a drone, an airplane, a helicopter, or the like.

In the surveying system of the embodiment, the imaging control apparatus 1 images a target zone At for surveying, while the mobile body M mounted with the imaging control apparatus 1 is being moved in the air over the target zone At. Then, on the basis of a captured image, a point cloud data indicating a three-dimensional structure of the target zone At is generated.

Figure 2:
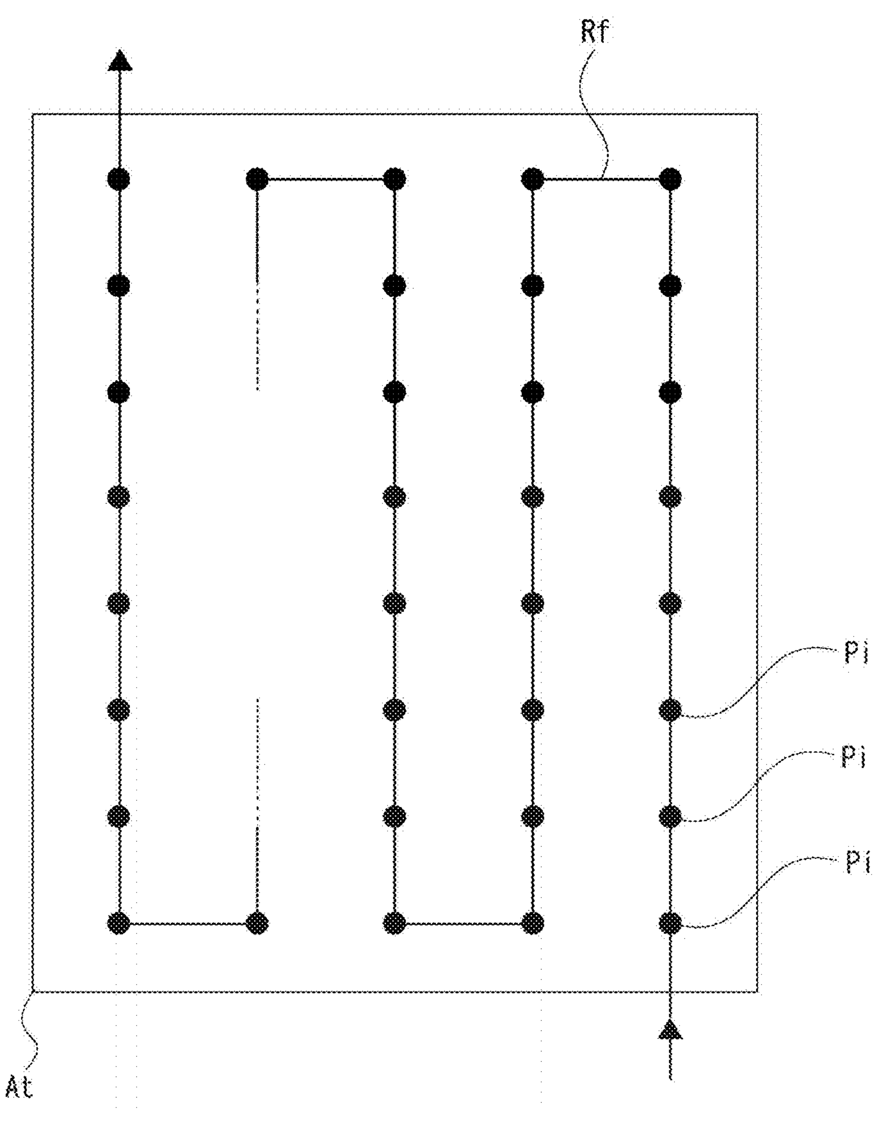
FIG. 2 is an explanatory diagram of a three-dimensional surveying technique on which the embodiment is premised.

A specific technique for three-dimensional surveying will be described with reference to FIG. 2.

As illustrated in the figure, in the present embodiment, multiple imaging execution points Pi are set in the target zone At. In the present embodiment, as a flying route Rf for the mobile body M, a flying route Rf that passes over the multiple imaging execution points Pi thus set in the target zone At is specified, and with the mobile body M caused to fly in accordance with the flying route Rf, the imaging control apparatus 1 images a ground side at each imaging execution point Pi to generate a three-dimensional point cloud based on the captured image for each imaging execution point Pi. Then, in the surveying system, point cloud data indicating the three-dimensional structure of the entire target zone At is generated on the basis of the information regarding the three-dimensional point cloud thus obtained for each imaging execution point Pi. In other words, surveying data that indicates three-dimensional surveying results for the entire target zone At is obtained.

Here, as also described above, the ground may be a slope, and in a case where the ground side is imaged in a direction vertical to a horizontal surface, relative to the ground as a slope, the ground in the captured image may have a reduced area, with the number of samples in the point cloud reduced.

Figures 3A, 3B:
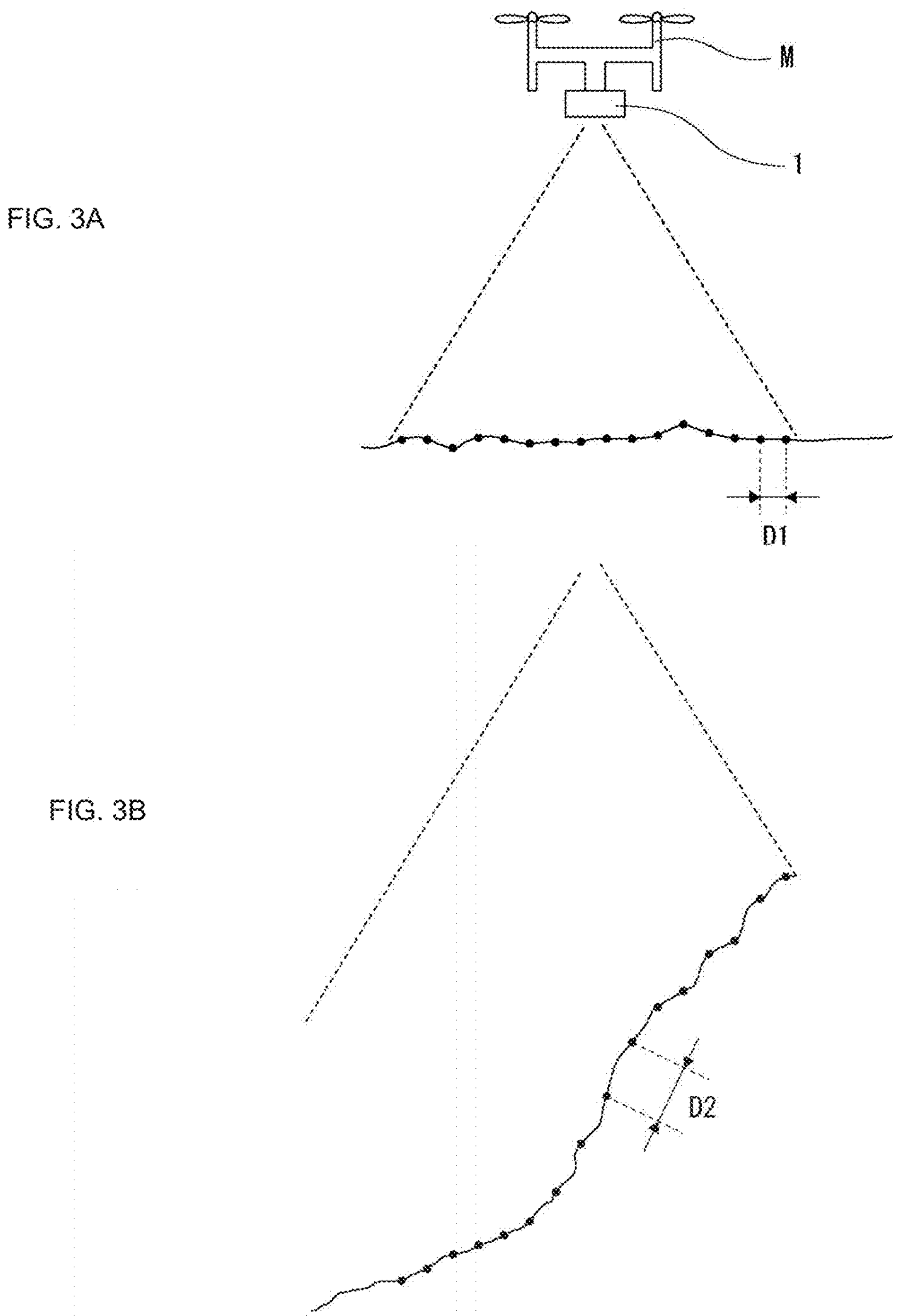
FIGS. 3A and 3B are explanatory diagrams of a reduced number of samples in a point cloud for a slope.

FIGS. 3A and 3B are explanatory diagrams indicating that the number of samples in the point cloud is reduced at a slope as described above. In FIG. 3A, on the premise that the imaging direction is the direction vertical to the horizontal surface, the sampling density of the point cloud is schematically denoted by "D1" in a case where the ground to be imaged is a generally horizontal ground. Additionally, in FIG. 3B, on the same premise, the sampling density is schematically denoted by "D2" in a case where the ground to be imaged is the ground as a slope. A comparison between FIGS. 3A and 3B indicates that the number of samples in the point cloud tends to decrease for the slope.

In view of the circumstances described above, in a case where the target zone At includes a slope, the slope may reduce the accuracy of three-dimensional surveying.

Hence, in the present embodiment, the following technique is adopted as a technique for three-dimensional surveying.

Figure 4A:
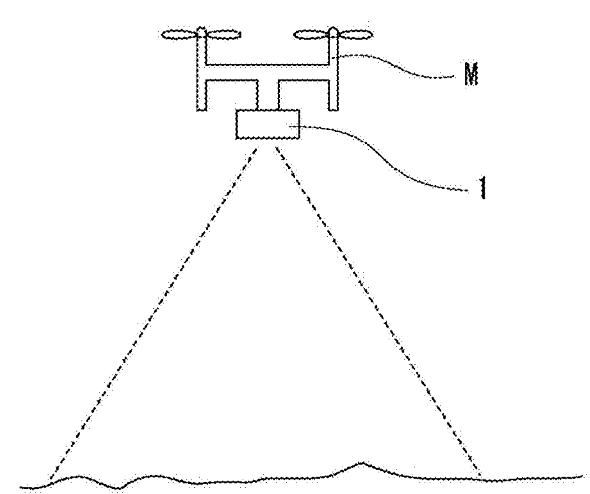
FIGS. 4A and 4B are explanatory diagrams of a three-dimensional surveying technique as a first embodiment.

First, basically, as illustrated in FIG. 4A, imaging is performed with the imaging direction set as a direction vertical to the horizontal surface. At this time, the imaging control apparatus 1 generates a three-dimensional point cloud on the basis of the captured image of the surface of the ground. In a case where the ground is not a slope, the information regarding the three-dimensional point cloud can be treated as appropriate information.

Then, in the present embodiment, the orientation of the ground is estimated on the basis of the captured image obtained by the imaging in the imaging direction set as the direction vertical to the horizontal surface as described above, and on the basis of the information regarding the estimated orientation of the ground, whether the ground to be imaged is a slope or not is determined. In a case where the ground is determined not to be a slope, the imaging control apparatus 1 waits to reach a next imaging execution point Pi. In other words, in a case where the ground is not a slope, point cloud data of the entire target zone At is generated using the information regarding the three-dimensional point cloud generated by the imaging in the imaging direction set as the direction vertical to the horizontal surface as described above.

On the other hand, in a case where the ground is determined to be a slope, the imaging control apparatus 1 controls the imaging direction to an orientation corresponding to the orientation of the ground, images the ground, and generates a three-dimensional point cloud based on the captured image. Then, after a three-dimensional point cloud is generated on the basis of the captured image obtained with the imaging direction set as the orientation corresponding to the orientation of the ground, the imaging control apparatus 1 waits to reach the next imaging execution point Pi.

(1-2. Configuration of Control Apparatus)

FIG. 5 is a block diagram illustrating a configuration example of the imaging control apparatus 1 as a first embodiment for realizing a three-dimensional surveying technique as the first embodiment as described above.

As illustrated in the figure, the imaging control apparatus 1 includes an imaging section 2, a signal processing section 3, a memory section 4, a control section 5, a position sensor 6, an actuator 7, and an IMU (Inertial Measurement Unit).

The imaging section 2 is configured to obtain a captured image used at least to generate a three-dimensional point cloud. In the present example, it is assumed that, as point cloud data indicating a result of three-dimensional surveying of the target zone At, for each point, data (X, Y, Z, R, G, B) indicating three-dimensional coordinate information (X, Y, Z) and information (R, G, B) that is a luminance value for each of R, G, and B is generated.

Hence, the imaging section 2 in the present example is provided not only with a ranging sensor 22 for obtaining a captured image as a distance image used to generate a three-dimensional point cloud but also with an RGB sensor 21 for obtaining a captured image as an RGB image.

The imaging section 2 includes, as the RGB sensor 21, a CCD (Charge Coupled Devices) image sensor or a CMOS (Complementary Metal Oxide Semiconductor) image sensor in which R pixels, G pixels, and B pixels are two-dimensionally arranged in an array according to a predetermined rule, for example, a Bayer array.

Additionally, the ranging sensor 22 is assumed to be of a type in which pixels with light receiving elements are two-dimensionally arranged. For example, the sensor used is compatible with ranging based on a ToF scheme such as an iToF (indirect Time of Flight) scheme or a dToF (direct ToF) scheme.

Note that, in a case where the ranging sensor 22 used is compatible with the ToF scheme, the ranging sensor 22 is provided with a projector section (for example, a projector section that projects infrared light or the like) for obtaining reflected light from a subject, which is not illustrated in the figure because the projector section is less relevant to the essence of the present technology.

The imaging section 2 includes an RGB image generation section 23 and a distance image generation section 24 along with the RGB sensor 21 and the ranging sensor 22.

The RGB image generation section 23 executes color interpolation processing such as demosaic processing on a captured image based on a RAW image output from the RGB sensor 21, to generate an RGB image indicating a luminance value for each of R, G, and B on a per-pixel basis.

The distance image generation section 24 performs a predetermined operation for distance computation according to the ToF scheme on the basis of a light receiving signal for each pixel obtained by the ranging sensor 22 performing a light receiving operation corresponding to the ToF scheme, to generate a distance image.

The signal processing section 3 includes a processor, for example, a DSP (Digital Signal Processor), an FPGA (Field-Programmable Gate Array), or the like, and executes various processing operations for generating point cloud data indicating the result of three-dimensional surveying of the target zone At, on the basis of a captured image from the imaging section 2, in other words, a distance image and an RGB image in the present example.

Specifically, the signal processing section 3 includes functions as a three-dimensional point cloud generation section 3*a*, a ground orientation estimation section 3*b*, and a point cloud data generation section 3*c*.

The three-dimensional point cloud generation section 3*a* generates a three-dimensional point cloud on the basis of a distance image obtained by the imaging section 2.

Figure 6:
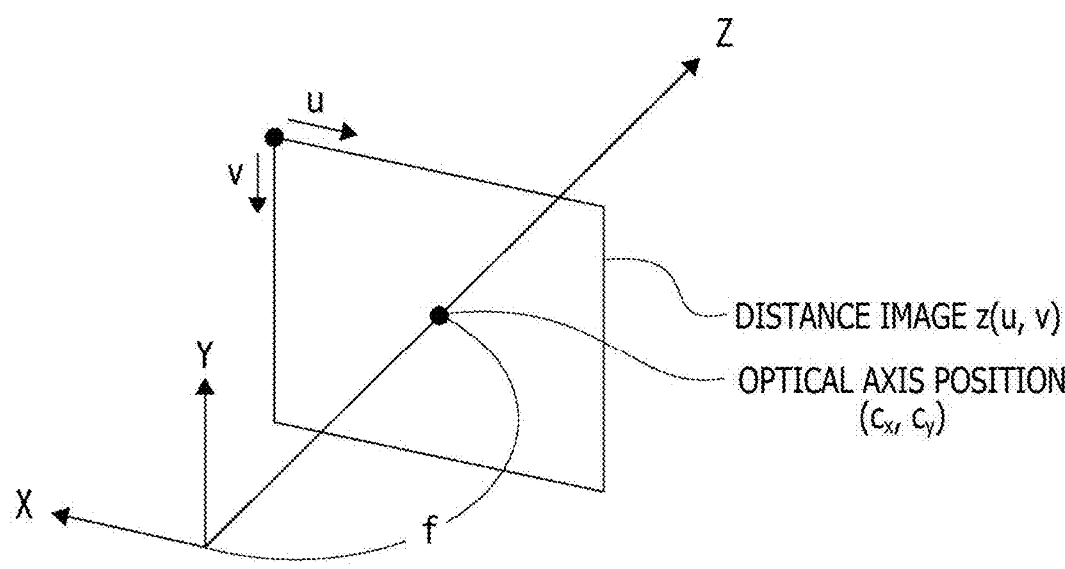
FIG. 6 is a diagram for describing an example of a generation technique for a three-dimensional point cloud based on a distance image.

With reference to FIG. 6, an example of a generation technique for a three-dimensional point cloud based on a distance image will be described.

As described above, the distance image is an image indicating a distance to a subject for each pixel (the sign for this distance is hereinafter referred to as "z"). In a case where a coordinate system for the distance image is a (u, v) coordinate system, the value z of each pixel in the distance image can be represented as z(u, v) as illustrated in the figure.

Additionally, the position of an optical axis of an imaging optical system for imaging the distance image with use of the ranging sensor 22 is denoted as ($c_x$, $c_y$) as illustrated in the figure, and the focal distance of the imaging optical system is denoted as "f."

Generation of a three-dimensional point cloud based on the distance image is executed as processing of using camera parameters as the above-described optical axis position ($c_x$, $c_y$) and focal distance f to convert the value z(u, v) of each pixel into coordinate information (X, Y, Z) of a point on a three-dimensional space as indicated below.

$$X = (c_x - u) \times (z(u, v))/f$$

$$Y = (c_y - u) \times (z(u, v))/f$$

$$Z = z(u, v)$$

In FIG. 5, the ground orientation estimation section 3*b* estimates the orientation of the ground on the basis of a captured image obtained by imaging the ground side from the air. Specifically, the ground orientation estimation section 3*b* in the present example estimates the orientation of the ground on the basis of the information regarding a three-dimensional point cloud that is generated by the three-dimensional point cloud generation section 3*a* on the basis of the distance image as described above.

Note that the processing by the ground orientation estimation section 3*b* will be described below.

The point cloud data generation section 3*c* generates point cloud data (X, Y, Z, R, G, B) as the result of three-dimensional surveying of the target zone At on the basis of the information (X, Y, Z) regarding the three-dimensional point cloud generated by the three-dimensional point cloud generation section 3*a* and the RGB image (R, G, B) obtained by the imaging section 2.

The memory section 4 includes a nonvolatile memory, for example, an HDD (Hard Disk Drive), an SDD (Solid State Drive), or the like, and is mainly used to store data used for signal processing by the signal processing section 3. For example, the memory section 4 is used to store distance images and RGB images.

The control section 5 includes a microcomputer including, for example, a CPU, a ROM, a RAM, and the like, and by executing processing based on a program stored in a predetermined storage device, for example, the above-described ROM, the CPU controls the whole imaging control apparatus 1.

The control section 5 is connected to the position sensor 6 and the actuator 7.

The position sensor 6 includes a GNSS (Global Navigation Satellite System) sensor, for example, a GPS (Global Positioning System) sensor or the like, to detect the position of the imaging control apparatus 1.

Note that the configuration for detecting the position of the imaging control apparatus 1 is not limited to a configuration using a GNSS sensor. For example, the position may be detected by a technology such as SLAM (Simultaneous Localization and Mapping) or UWB (Ultra Wide Band).

The actuator 7 is configured as an actuator, for example, a motor or the like, for driving a mechanism (imaging direction varying mechanism) for varying the imaging direction of the imaging section 2.

In the present example, driving the actuator 7 enables the direction of imaging by the imaging section 2 to be changed to a pan direction and a tilt direction.

On the basis of position information regarding the imaging control apparatus 1 detected by the position sensor 6, the control section 5 can determine arrival at the imaging execution point Pi described with reference to FIG. 2.

Additionally, by controlling driving of the actuator 7 on the basis of information regarding the orientation of the ground estimated by the ground orientation estimation section 3*b* in the signal processing section 3, the control section 5 can change the direction of imaging by the imaging section 2 to an orientation corresponding to the orientation of the ground.

Figure 4B:
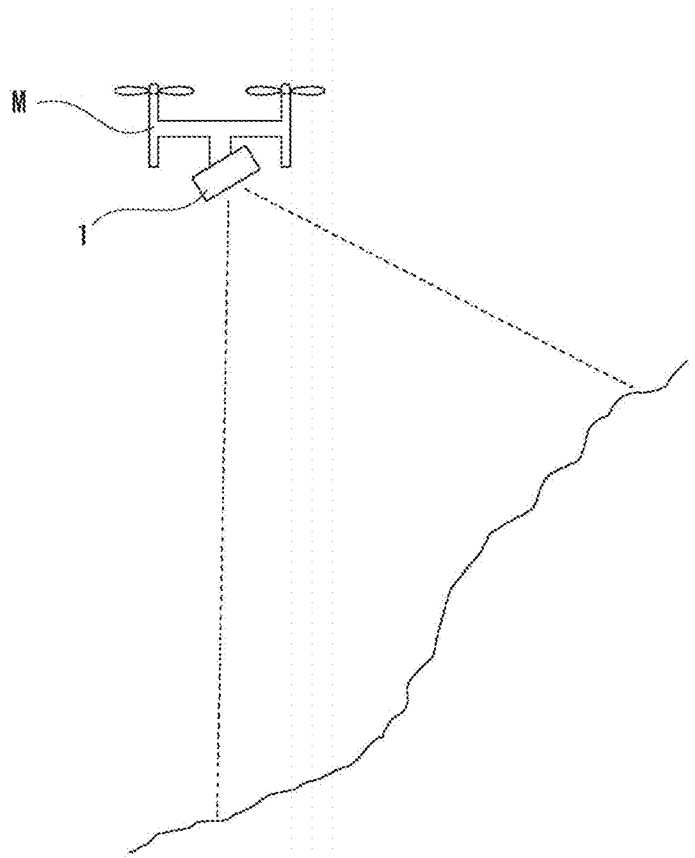

The control section 5 realizes the three-dimensional surveying technique as the first embodiment described above with reference to FIGS. 4A and 4B, by controlling operation of the imaging section 2 and the signal processing section 3 and driving of the actuator 7 on the basis of the position information regarding the imaging control apparatus 1 detected by the position sensor 6. A specific processing procedure executed by the control section 5 to realize the three-dimensional surveying technique will be described below.

The IMU 8 includes a motion sensor such as an acceleration sensor or a gyro sensor (angular velocity sensor) and detects, as posture information regarding the imaging section 2, inclination of the imaging section 2 in each of a yaw direction, a pitch direction, and a roll direction.

The posture information detected by the IMU 8 is fed to the signal processing section 3 and is used for processing for estimating the orientation of the ground which processing is executed by the ground orientation estimation section 3*b*, as described below.

Figure 7:
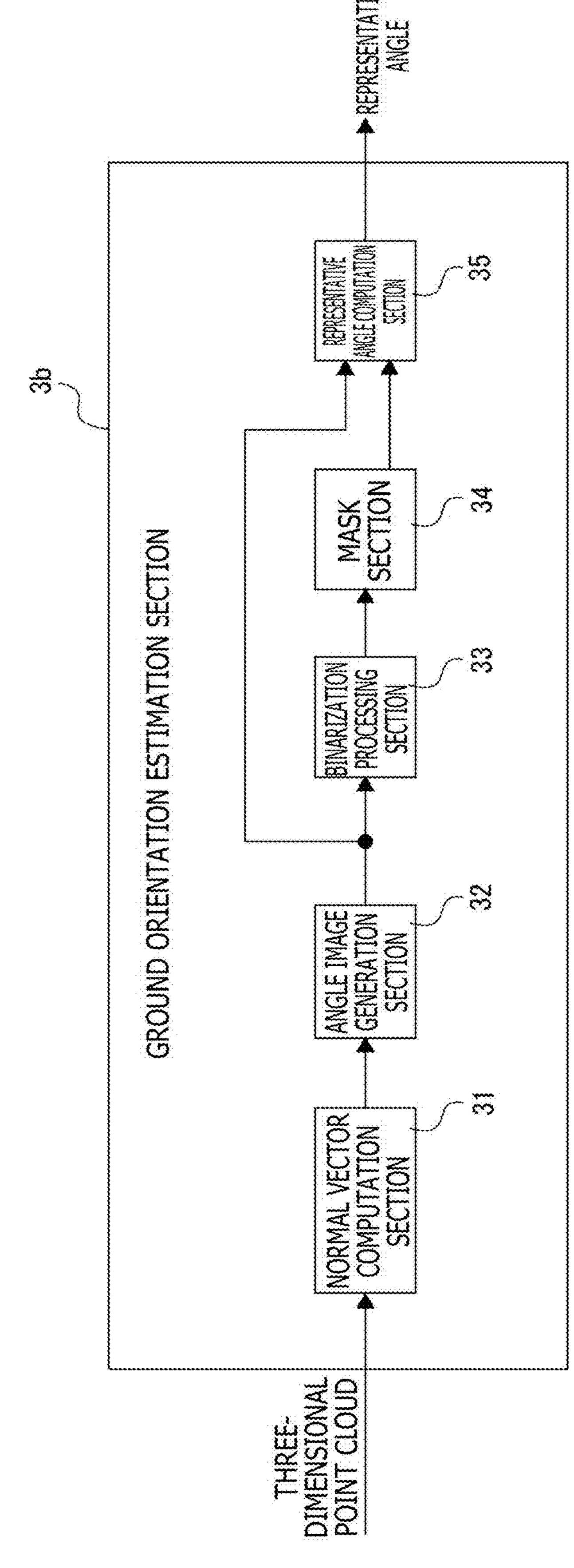
FIG. 7 is a block diagram illustrating a configuration example of a ground orientation estimation section in the first embodiment.

FIG. 7 is a block diagram illustrating a configuration example of the ground orientation estimation section 3*b*.

As illustrated in the figure, the ground orientation estimation section 3*b* includes a normal vector computation section 31, an angle image generation section 32, a binarization processing section 33, a mask section 34, and a representative angle computation section 35.

A three-dimensional point cloud generated by the three-dimensional point cloud generation section 3*a* is input to the normal vector computation section 31. The normal vector computation section 31 determines a normal vector for each position on the ground on the basis of a positional relation between points adjacent to each other from among the three-dimensional point cloud.

Figure 8:
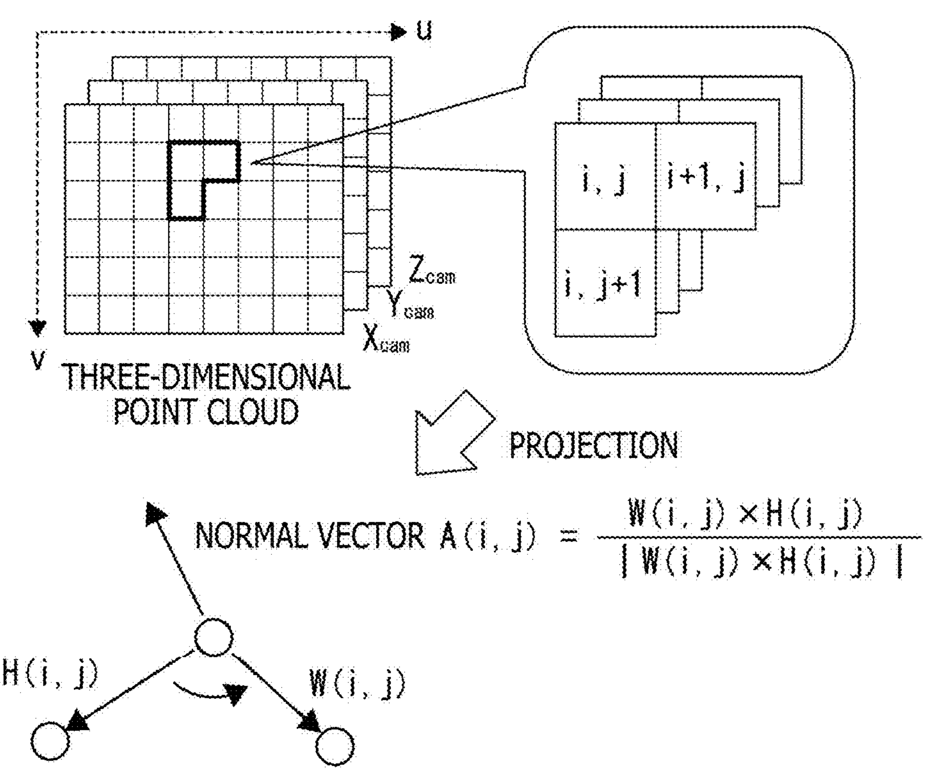
FIG. 8 is an explanatory diagram of an example of a computation technique for a normal vector executed by a normal vector computation section.

With reference to FIG. 8, an example of a computation technique for a normal vector by the normal vector computation section 31 will be described.

In this example, the normal vector is computed for each of the points in the three-dimensional point cloud.

In this case, the normal vector is determined on the basis of coordinate information (represented as $X_{cam}$, $Y_{cam}$, and $Z_{cam}$ in the figure) regarding the points on the three-dimensional space determined for each pixel in the distance image. Specifically, on the basis of three-dimensional coordinate information (X, Y, Z) regarding three pixels including a pixel to be processed (represented as (i, j) in a camera coordinate system) in the distance image, one of two pixels adjacent to the pixel to be processed in a vertical direction (v direction) (this pixel is hereinafter referred to as a "vertically adjacent pixel"), and one of two pixels adjacent to the pixel to be processed in a horizontal direction (u direction) (this pixel is hereinafter referred to as a "horizontally adjacent pixel"), a normal vector A(i, j) of a surface of a triangle formed by connecting the points of the three pixels is determined.

On the basis of a vector H(i, j) from the point of the pixel to be processed to the point of the vertically adjacent pixel and a vector W(i, j) from the point of the pixel to be processed to the point of the horizontally adjacent pixel, the normal vector A(i, j) can be computed by:

$$\text{Normal vector } A(i, j) = (W(i, j) \times H(i, j)) / |W(i, j) \times H(i, j)|$$

The normal vector A(i, j) as described above is computed for each point in the distance image (in other words, for each point in the three-dimensional point cloud generated).

Note that the normal vector A is not limited to determination for each point in the three-dimensional point cloud. For example, a technique similar to that described above may be used to determine a normal vector A for each area including multiple points. This does not alter the fact that the normal vector is determined for each position on the ground.

In FIG. 7, on the basis of the normal vector A(i, j) computed by the normal vector computation section 31, the angle image generation section 32 generates an angle image that is an image indicating, for each pixel, the angle at which the ground is oriented.

Figure 9:
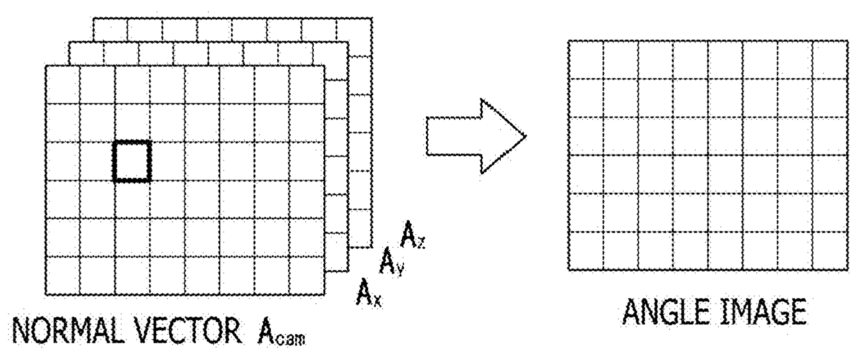
FIG. 9 is an explanatory diagram of an example of a generation technique for an angle image executed by an angle image generation section.

FIG. 9 is an explanatory diagram for an example of a generation technique for an angle image executed by the angle image generation section 32.

Here, the normal vector A(i, j) computed for each pixel in the distance image by the normal vector computation section 31 is represented as a normal vector $A_{cam}$.

As illustrated in the figure, the angle image is generated by computing an inner product of the normal vector $A_{cam}$ and a vertical vector $h_{cam}$ for each pixel. The vertical vector $h_{cam}$ is a vector indicating the vertical direction in the camera coordinate system (u, v coordinate system). In other words, since the present example assumes that a distance image used as a basis for generation of an angle image is captured with the imaging direction of the imaging section 2 set as a direction vertical to the horizontal direction, the vertical vector $h_{cam}$ is a vector indicating the direction vertical to the horizontal surface.

The angle image is generated by computing an angle θ indicating the orientation of the ground for each pixel in accordance with "θ=cons−1[$A_{cam} \cdot h_{cam}$]" depicted in the figure.

Here, the distance image used as a basis for generation of an angle image is not necessarily captured in the imaging direction vertical to the horizontal surface. Hence, in the present example, the angle image generation section 32 corrects the vertical vector $h_{cam}$ used for generation of an angle image, on the basis of posture information (yaw, pitch, and roll) regarding the imaging section 2 detected by the IMU 8 illustrated in FIG. 5. Thus, even in a case where the imaging direction of the imaging section 2 deviates from the direction vertical to the horizontal surface when the distance image used as a basis for generation of an angle image is captured, the deviation can be corrected, and an appropriate angle image that indicates the angle θ to the direction vertical to the horizontal surface can be obtained.

In FIG. 7, the binarization processing section 33, the mask section 34, and the representative angle computation section 35 are provided to determine a representative angle indicating the representative angle θ of the ground to be imaged, on the basis of the angle image.

FIGS. 10A, 10B, 10C, and 10D are explanatory diagrams of an example of a computation technique for the representative angle in the embodiment.

Figures 10A, 10B, 10C, 10D:
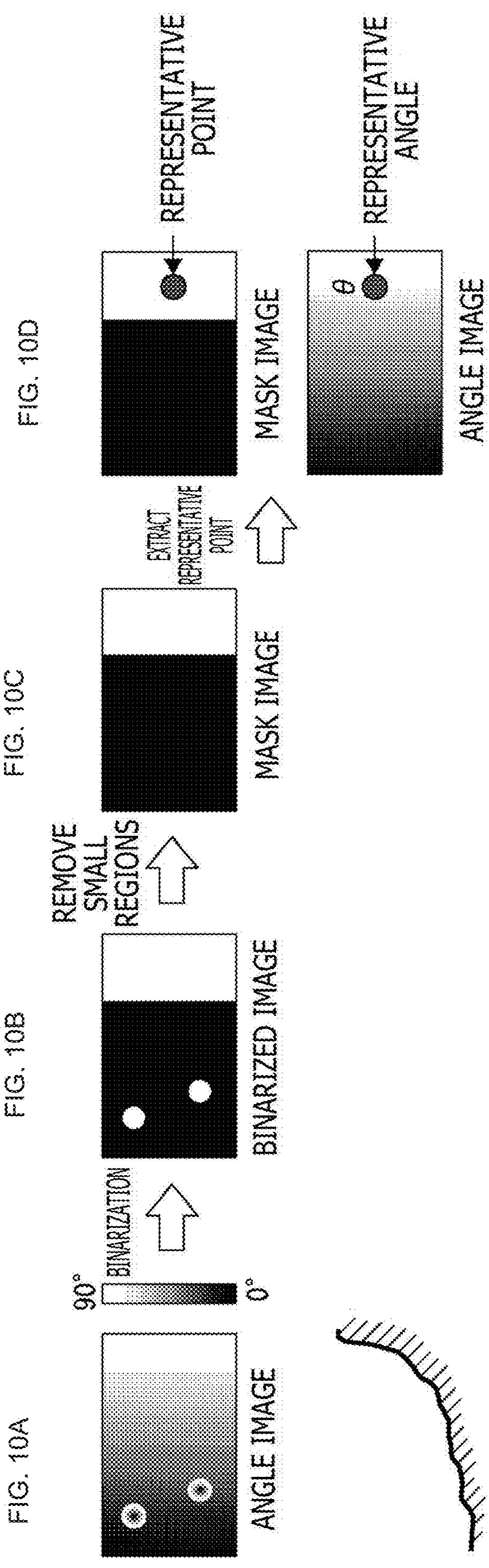
FIGS. 10A, 10B, 10C, and 10D are explanatory diagrams of an example of a computation technique for a representative angle in the embodiment.

FIG. 10A schematically illustrates an angle image generated by the angle image generation section 32.

For the angle image as illustrated in FIG. 10A, the binarization processing section 33 generates a binarized image in which pixels with an angle θ (absolute value) of a predetermined angle threshold or larger are labeled "1" and the other pixels are labeled "0" (see FIG. 10B).

For the binarized image obtained by the binarization processing section 33, the mask section 34 generates a mask image in which image regions that have an area less than a predetermined area threshold, among image regions with an angle θ greater than or equal to the angle threshold, are masked (see FIG. 10C). In other words, the image regions left after masking has an angle θ greater than or equal to the angle threshold and an area greater than or equal to the area threshold.

The representative angle computation section 35 computes a representative angle on the basis of the mask image generated by the mask section 34 and the angle image generated by the angle image generation section 32. Specifically, the representative angle computation section 35 specifies a representative point for an image region in the mask image which region has an angle θ greater than or equal to the angle threshold (see an upper part of FIG. 10D). The representative point may be defined as a central point of the image region in the mask image which region has an angle θ greater than or equal to the angle threshold.

Further, the representative angle computation section 35 specifies, as the representative angle, the angle θ in the pixel used as the representative point (see a lower part of FIG. 10D).

Note that, in a case where the mask image includes multiple image regions having an angle θ greater than or equal to the angle threshold, the representative point may be specified as the central point of one of the image regions that has the largest area.

Additionally, the representative angle is not limited to the angle θ of the representative point as described above. For example, the representative angle may be computed by using, as the representative angle, an average value of the angle θ of each of the pixels belonging to a certain image region in the mask image which region has an angle θ greater than or equal to the angle threshold.

Here, in the first embodiment, the fact that the representative angle has been computed by the representative angle computation section 35 indicates that the ground the orientation of which is to be estimated, that is, the ground for which the distance image has been captured to estimate the orientation of the ground, is a slope.

Thus, in the first embodiment, the control section 5 can determine whether the target ground is a slope or not, depending on whether the ground orientation estimation section 3*b* has computed the representative angle or not.

(1-3. Processing Procedure)

Figure 11:
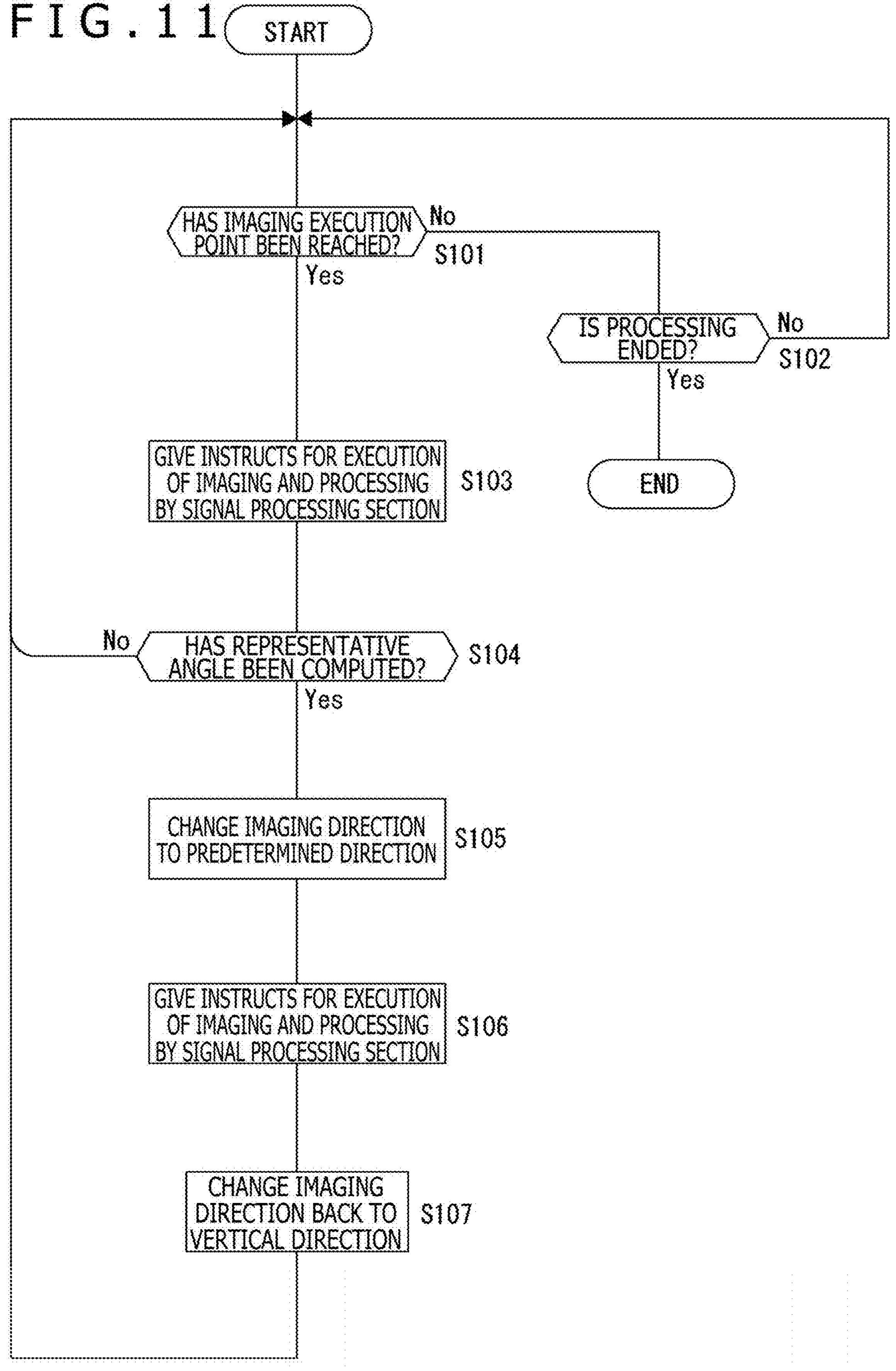
FIG. 11 is a flowchart illustrating an example of a processing procedure for implementing the three-dimensional surveying technique as the first embodiment.

FIG. 11 is a flowchart illustrating an example of a processing procedure executed by the control section 5 to realize the three-dimensional surveying technique as the first embodiment.

Note that, in the present example, when the processing depicted in FIG. 11 is executed, the direction of imaging by the imaging section 2 is assumed to be the direction vertical to the horizontal surface.

First, in step S101, the control section 5 determines whether the imaging execution point Pi has been reached or not. That is, on the basis of the position information regarding the imaging control apparatus 1 detected by the position sensor 6, the imaging control apparatus 1 determines whether the imaging control apparatus 1 has reached any imaging execution point Pi or not.

In a case where it is determined in step S101 that the imaging execution point Pi has not been reached, the control section 5 proceeds to step S102 to determine whether the processing is to be ended or not, that is, whether a predetermined condition has been satisfied or not under which the processing for three-dimensional surveying of the entire target zone At is to be ended, for example, whether a predetermined operation has been input or a predetermined notification has been provided by an external apparatus. In step S102, in a case where it is determined that the processing is not to be ended, the control section 5 returns to step S101.

As a result of the processing in steps S101 and S102 descried above, the control section 5 waits for either arrival at the imaging execution point Pi or the end of the processing.

In step S101, in a case where the imaging execution point Pi is determined to have been reached, the control section 5 proceeds to step S103 to give instructions for execution of imaging and processing by the signal processing section 3. That is, the control section 5 gives instructions for execution of image capturing of the RGB image and the distance image by the imaging section 2 and processing by the signal processing section 3 as the three-dimensional point cloud generation section 3*a* and the ground orientation estimation section 3*b*.

In step S104 subsequent to step S103, the control section 5 determines whether the representative angle has been computed or not. That is, processing as the ground orientation estimation section 3*b* described above is executed to determine whether the representative angle has been computed or not.

In a case where it is determined in step S104 that the representative angle has not been computed (in other words, in a case where it is determined that the ground is not a slope), the control section 5 returns to step S101.

Thus, in a case where the ground to be imaged is not a slope, arrival at the next imaging execution point Pi is waited for. That is, in a case where the ground is not a slope, point cloud data regarding the entire target zone At is generated using the information regarding the three-dimensional point cloud generated by imaging in the imaging direction set as the direction vertical to the horizontal surface.

On the other hand, in a case where it is determined in step S104 that the representative angle has been computed (in a case where it is determined that the ground is a slope), the control section 5 proceeds to step S105 to execute processing for changing the imaging direction to a predetermined direction. In the present example, the inclining direction of the slope is assumed to include only the right and left directions from among the front, back, right, and left directions. Further, the first embodiment does not require the imaging direction to be set directly opposite to the ground as in a second embodiment described below and only requires at least the imaging direction to be close to the orientation of the ground. Specifically, in a case where the ground is a slope rising diagonally to the right (see FIGS. 3B and 4B), that is, the representative angle is a positive angle, the actuator 7 is driven and controlled in such a manner that the imaging direction is tilted through a preset angle rightward from the direction vertical to the horizontal surface (in other words, an angle of 0 degrees). On the other hand, in a case where the ground is a slope rising diagonally to the left, that is, the representative angle is a negative angle, the actuator 7 is driven and controlled in such a manner that the imaging direction is tilted through a preset angle leftward from the direction vertical to the horizontal surface.

In step S106 subsequent to step S105, the control section 5 gives instructions for execution of imaging and processing by the signal processing section. The processing in step S106 is similar to the processing in step S103 described above.

In a case where the ground is a slope, execution of the processing in step S106 causes the imaging section 2 to capture an RGB image and a distance image in the imaging direction corresponding to the orientation of the ground and causes a three-dimensional point cloud to be generated on the basis of the captured distance image.

Note that, in step S106, the instruction to the signal processing section 3 to execute the processing thereof may be only the instruction to the three-dimensional point cloud generation section 3*a* to execute the processing thereof.

In step S107 subsequent to step S106, the control section 5 executes processing for changing the imaging direction back to the vertical direction, that is, processing for driving and controlling the actuator 7 to change the imaging direction back to the direction vertical to the horizontal surface. The control section 5 then returns to step S101.

This allows the processing in step S103 to be executed with the imaging direction set as the vertical direction in a case where the next imaging execution point Pi is reached.

Moreover, according to the processing flow of step S104→S105→S106→S107→S101 described above, in a case where the ground is a slope, imaging is performed with the imaging direction controlled to the orientation corresponding to the orientation of the ground, a three-dimensional point cloud is generated on the basis of the captured distance image, and then arrival at the next imaging execution point Pi is waited for. Thus, for the imaging execution point Pi as a slope, the information regarding the three-dimensional point cloud that is generated, in generation of point cloud data regarding the entire target zone At, with the imaging direction set as the orientation corresponding to the orientation of the ground can be used.

In a case where it is determined in step S102 described above that the processing is to be ended, the control section 5 ends the series of processing operations illustrated in FIG. 11.

Note that, since the above-described example assumes that the inclining direction of the ground includes only the right and left directions from among the front, back, right, and left directions, the control of the imaging direction is performed only in the right and left directions, but that control for tilting the imaging direction in the front and back directions can also be performed in association with inclination in the front and back directions. Alternatively, control for tilting the imaging direction in each of the front, back, right, and left directions can be performed in association with inclination in each of the front, back, right, and left directions.

2. Second Embodiment

Now, a second embodiment will be described. In the second embodiment, in a case where the ground is a slope, the imaging direction is controlled to a direction indicated by a target angle adaptively determined relative to the orientation of the ground.

Figure 12:
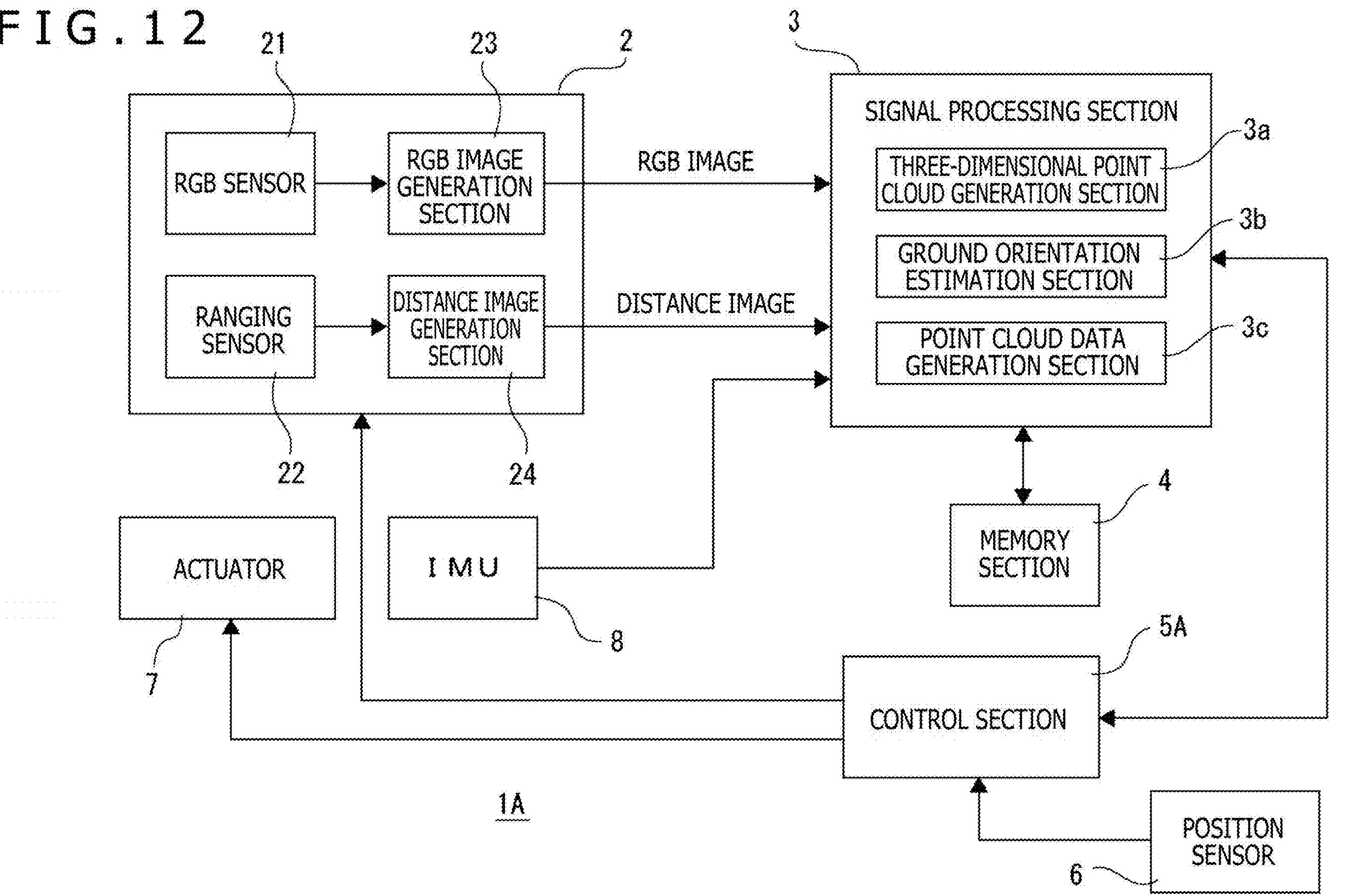
FIG. 12 is a block diagram illustrating a configuration example of a control apparatus as a second embodiment.

FIG. 12 is a block diagram illustrating a configuration example of an imaging control apparatus 1A as a second embodiment.

Note that, in the description below, portions similar to already described portions are denoted by the same signs or the same step numbers, and description of these portions is omitted.

In comparison, the imaging control apparatus 1A differs from the imaging control apparatus 1 in that a control section 5A is provided instead of the control section 5.

The control section 5A is similar to the control section 5 in terms of a hardware configuration but differs from the control section 5 in that the control section 5A executes processing in FIG. 13 described below instead of the processing in FIG. 11 described above.

FIG. 13 is a flowchart illustrating an example of a processing procedure executed by the control section 5A to realize a three-dimensional surveying technique as the second embodiment.

This processing procedure differs from the processing depicted in FIG. 11 in that processing in step S201 is executed instead of the processing in step S105.

Specifically, in step S201, the control section 5A executes processing for controlling the imaging direction to a direction directly opposite to the ground on the basis of the representative angle. That is, the actuator 7 is driven and controlled in such a manner that the angle in the imaging direction changes from an angle vertical to the horizontal surface (0 degrees) to an angle matching the representative angle.

Note that, in the second embodiment, the control of the imaging direction in a case where the ground is a slope is not limited to control with the target angle set as the angle of the direction directly opposite to the ground as described above, and that alternative possible control includes, for example, control with the target angle set as an angle offset by a preset angle from the angle of the direction directly opposite to the ground (that is, the representative angle in the present example), and the like.

Note that the above description assumes that, in a case where the mask image includes multiple image regions with an angle θ greater than or equal to the angle threshold, the representative point is specified only for the image region with the largest area (that is, the representative angle is set), as is the case with the first embodiment described above, but that, in the second embodiment, in a case where the mask image includes multiple image regions with an angle θ greater than or equal to the angle threshold, the representative point and the representative angle may be specified for each image region. In that case, at the imaging execution point Pi determined to be a slope, imaging may be performed, for each representative angle, with the imaging direction at the angle adaptively determined relative to the representative angle.

3. Third Embodiment

A third embodiment reduces the time required to three-dimensionally survey the target zone At, by using two imaging control apparatuses, a preceding imaging control apparatus and a following imaging control apparatus.

Figure 14:
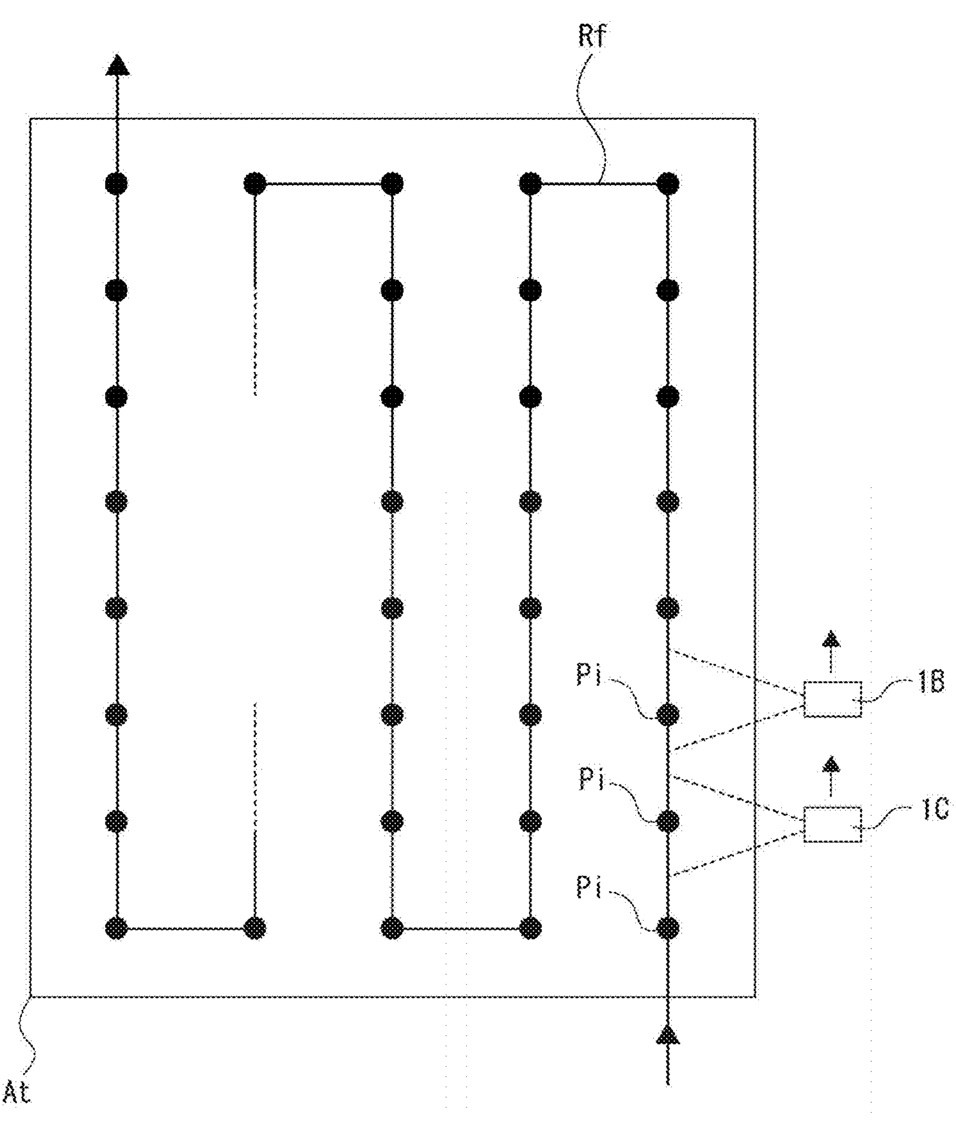
FIG. 14 is an explanatory diagram of a three-dimensional surveying technique as a third embodiment.

Specifically, as illustrated in FIG. 14, the third embodiment assumes the use of two imaging control apparatuses, namely, an imaging control apparatus 1B as a preceding apparatus preceding on the flight route Rf and an imaging control apparatus 1C as a following apparatus following the imaging control apparatus 1B on the flight route Rf.

In the third embodiment, the imaging control apparatus 1B as the preceding apparatus performs imaging in the imaging direction vertical to the horizontal surface at each imaging execution point Pi, generates a three-dimensional point cloud on the basis of the captured image, and estimates the orientation of the ground. Further, in a case where the imaging control apparatus 1B determines that the ground is a slope as a result of estimation of the orientation of the ground, it notifies the imaging control apparatus 1C as the following apparatus that the imaging execution point is a slope.

In other words, in the third embodiment, the imaging control apparatus 1B as the preceding apparatus performs the function of generating a three-dimensional point cloud for a non-slope and the function of notifying, in a case where it detects a slope, the following apparatus of the detection.

Meanwhile, at the imaging execution point Pi where the imaging control apparatus 1C as the following apparatus is notified by the imaging control apparatus 1B as the preceding apparatus that the ground is a slope, the imaging control apparatus 1C performs imaging in the imaging direction set as the direction corresponding to the orientation of the ground and generation of a three-dimensional point cloud based on the captured image.

In the first and second embodiments described above, in a case where the imaging execution point Pi is a slope, the imaging control apparatus 1 or 1A needs, after performing imaging and generation of a three-dimensional point cloud with the imaging direction set as the vertical direction, to perform imaging and generation of a three-dimensional point cloud with the imaging direction changed to a direction corresponding to the orientation of the ground.

In contrast, according to the three-dimensional surveying technique as the third embodiment described above, the imaging control apparatus 1B as the preceding apparatus needs to perform imaging and generation of a three-dimensional point cloud only once even in a case where the imaging execution point Pi is a slope, and the imaging control apparatus 1C as the following apparatus needs to perform imaging and generation of a three-dimensional point cloud for the slope only once.

Therefore, compared to the cases of the first and second embodiments, the third embodiment can reduce the length of time for which the imaging control apparatus stays at the imaging execution point Pi as a slope, enabling a reduction in time required for three-dimensional surveying of the target zone At.

Figure 15:
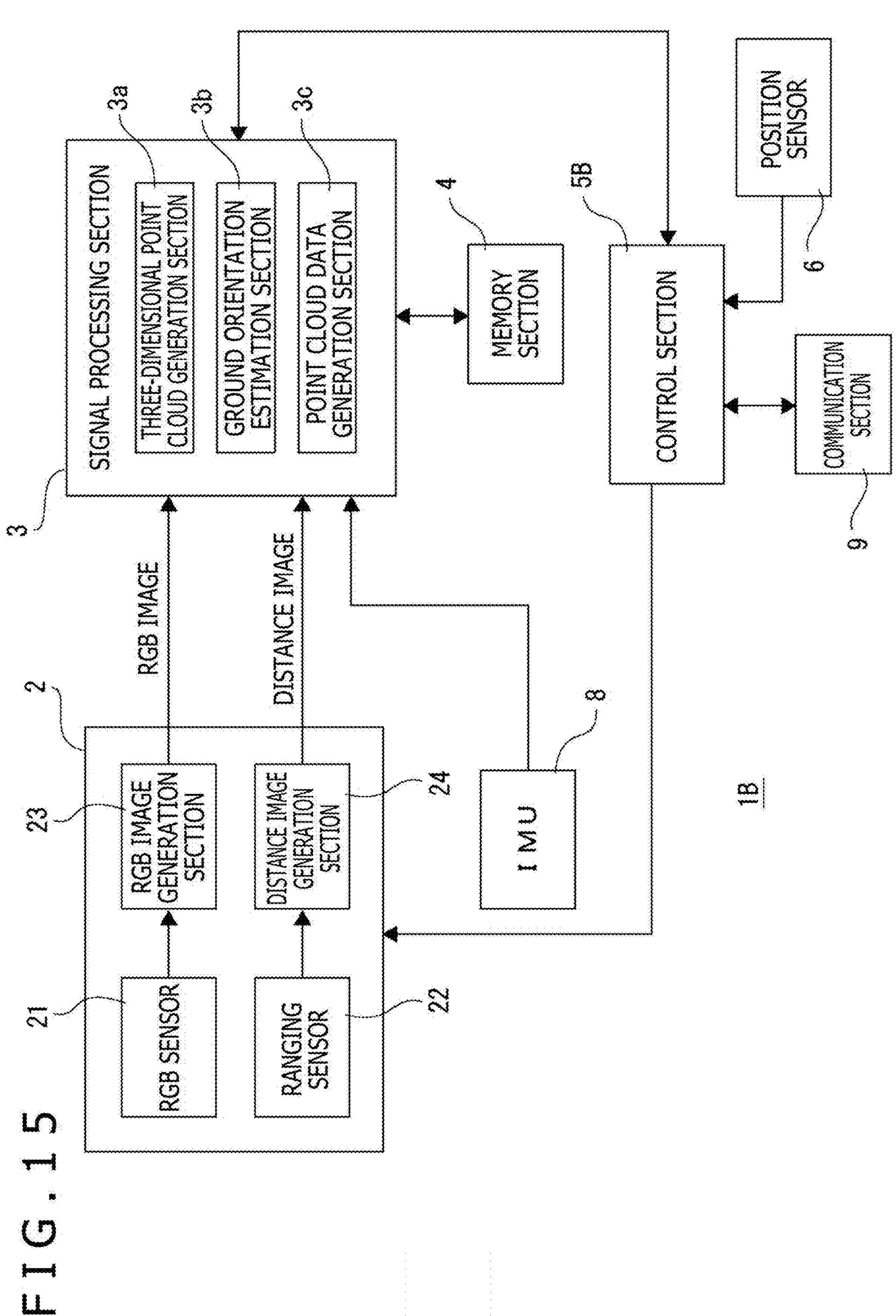
FIG. 15 is a block diagram illustrating a configuration example of a control apparatus as a preceding apparatus.
Figure 16:
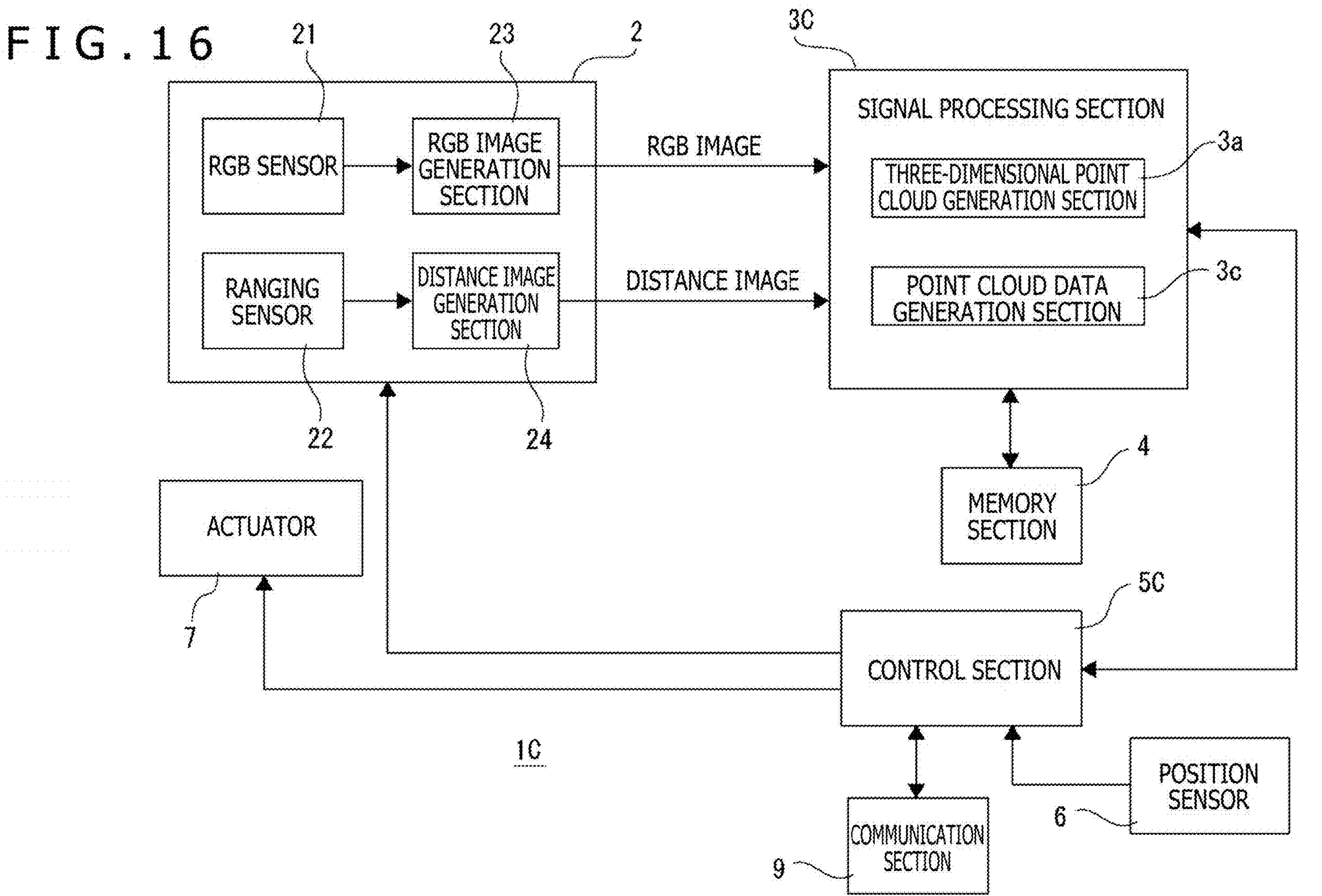
FIG. 16 is a block diagram illustrating a configuration example of a control apparatus as a following apparatus.

FIG. 15 is a block diagram illustrating a configuration example of the imaging control apparatus 1B as the preceding apparatus, and FIG. 16 is a block diagram illustrating a configuration example of the imaging control apparatus 1C as the following apparatus.

In FIG. 15, in comparison, the imaging control apparatus 1B differs from the imaging control apparatus 1 described in the first embodiment in that a control section 5B is provided instead of the control section 5, a communication section 9 is added, and the actuator 7 is omitted.

The communication section 9 is provided to perform data communication with the imaging control apparatus 1C as the following apparatus and can, for example, perform wireless data communication with the imaging control apparatus 1C.

The control section 5B is similar to the control section 5 in terms of the hardware configuration but differs from the control section 5 in that the control section 5B executes processing as the preceding apparatus for realizing the three-dimensional surveying technique as the third embodiment described above.

In FIG. 16, in comparison, the imaging control apparatus 1C differs from the imaging control apparatus 1 described in the first embodiment in that a control section 5C is provided instead of the control section 5, the communication section 9 is added, a signal processing section 3C is provided instead of the signal processing section 3, and the IMU 8 is omitted.

The communication section 9 is provided to perform data communication with the imaging control apparatus 1B as the preceding apparatus and can, for example, perform wireless data communication with the communication section 9 of the imaging control apparatus 1B.

In comparison, the signal processing section 3C differs from the signal processing section 3 in that the function as the ground orientation estimation section 3*b* is omitted.

The control section 5C is similar to the control section 5 in terms of the hardware configuration but differs from the control section 5 in that the control section 5C executes processing as the following apparatus for realizing the three-dimensional surveying technique as the third embodiment described above.

Figure 17:
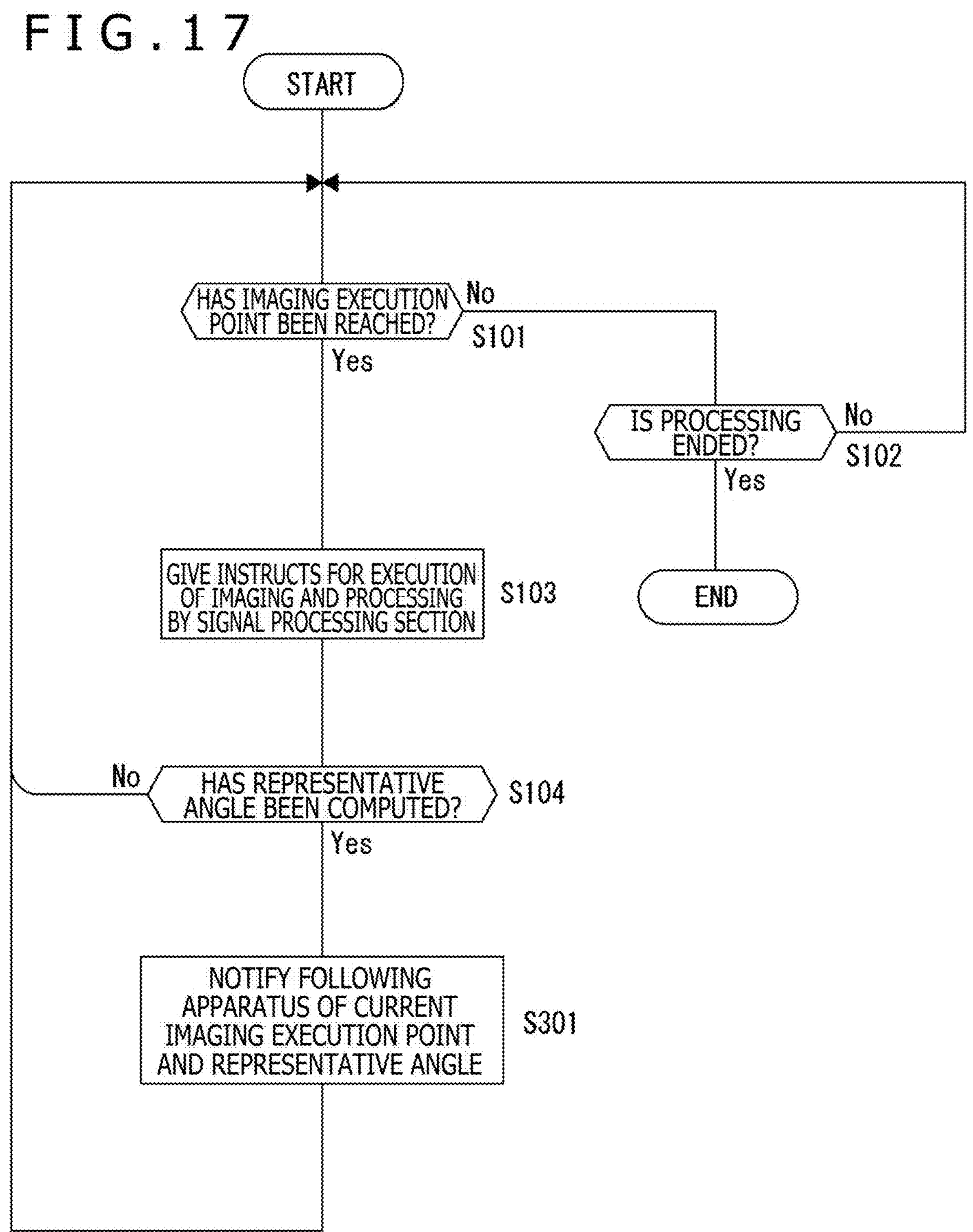
FIG. 17 is a flowchart illustrating an example of a processing procedure for implementing processing as the preceding apparatus in the third embodiment.

FIG. 17 is a flowchart illustrating an example of a processing procedure executed by the control section 5B to realize processing as the preceding apparatus in the third embodiment.

The processing procedure differs from the processing by the control section 5 illustrated in FIG. 11 described above in that processing in step S301 is executed instead of the processing from step S105 to step S106.

Specifically, in step S301, the control section 5B executes processing for notifying the following apparatus of the current imaging execution point Pi and the representative angle. That is, the control section 5B executes processing for notifying, via the communication section 9, the imaging control apparatus 1C (control section 5C) of information indicating the current imaging execution point Pi and information regarding the representative angle determined in step S104 to have been computed.

FIG. 18 is a flowchart illustrating an example of a processing procedure executed by the control section 5C to realize processing as the following apparatus in the third embodiment.

The processing procedure differs from the processing by the control section 5A illustrated in FIG. 13 described above in that the processing in step S103 is omitted, processing in step S401 is executed instead of the processing in step S104, and the processing in step S107 is omitted.

In a case where it is determined in step S101 that the imaging execution point Pi has been reached, the control section 5C determines in step S401 whether the control section 5C has been notified of the representative angle for the current imaging execution point Pi or not. This corresponds to determining whether the current imaging execution point Pi is a slope or not on the basis of whether notification information has been provided from the imaging control apparatus 1B as the preceding apparatus or not.

In a case where it is determined in step S401 that no representative angle has been notified for the current imaging execution point Pi, the control section 5C returns to step S101. In other words, for the imaging execution point Pi as a non-slope, the following apparatus refrains from performing imaging by the imaging section 2 and the processing by the signal processing section 3C based on the captured image.

On the other hand, in a case where it is determined in step S401 that the representative angle has been notified for the current imaging execution point Pi, the control section 5C proceeds to processing in step S201. Thus, for the imaging execution point Pi as a slope, the following apparatus performs imaging in the imaging direction at the angle adaptively determined relative to the representative angle and the processing by the signal processing section 3C based on the captured image (generation of a three-dimensional point cloud in the present example).

Note that, in the above-described example, the following apparatus performs imaging in the imaging direction at the angle adaptively determined relative to the orientation of the ground, as is the case with the second embodiment, but that, alternatively, the following apparatus may perform imaging in the imaging direction at a preset angle as is the case with the first embodiment.

4. Variation

The embodiments according to the present technology have been described above. However, the present technology is not limited to the specific examples described above and may take diverse configurations as variations.

For example, in the examples described above, the orientation of the ground is estimated on the basis of the information regarding the normal vector computed from the distance image. However, the orientation of the ground can be estimated on the basis of a polarized image obtained using a polarization sensor 25.

FIG. 19 is a block diagram illustrating a configuration example of an imaging control apparatus 1D as a variation in which the orientation of the ground is estimated on the basis of the polarized image as described above.

In comparison, the imaging control apparatus 1D differs from the imaging control apparatus 1 as the first embodiment in that an imaging section 2D is provided instead of the imaging section 2, a signal processing section 3D is provided instead of the signal processing section 3, and a control section 5D is provided instead of the control section 5.

The imaging section 2D differs from the imaging section 2 in that the imaging section 2D is provided with the polarization sensor 25 and a polarized image generation section 26, in addition to the RGB sensor 21, the ranging sensor 22, the RGB image generation section 23, and the distance image generation section 24.

The signal processing section 3D differs from the signal processing section 3 in that the signal processing section 3D is provided with a ground orientation estimation section 3*b*D instead of the ground orientation estimation section 3*b*.

The control section 5D is similar to the control section 5 in terms of the hardware configuration but differs from the control section 5 in that the control section 5D provides, as an instruction to perform imaging, an instruction to the polarization sensor 25 and the polarized image generation section 26 to capture a polarized image, in addition to the instructions to capture an RGB image and a distance image.

As is well known, the polarization sensor 25 includes polarization pixel units two-dimensionally arranged, each polarization pixel unit including multiple pixels each provided with a polarization filter to transmit, through each pixel, light in a different polarization direction (linearly polarized light). For example, the polarization pixel unit includes four pixels and is configured in such a manner that the pixels respectively receive light in polarization directions at 0 degrees, 45 degrees, 90 degrees, and 135 degrees.

The polarized image generation section 26 generates a polarized image on the basis of an RAW image (image indicating a received light signal value for each pixel) obtained by the polarization sensor 25. The polarized image means an image indicating information representing a polarization state of incident light for each pixel.

For example, the polarized image generation section 26 executes interpolation processing on the RAW image as synchronization processing to generate a polarization direction image indicating a received light signal value in each polarization direction for each pixel. Specifically, in the present example, for each pixel, a polarization direction image that indicates a received light signal value for light in each of the polarization directions corresponding to 0 degrees, 45 degrees, 90 degrees, 135 degrees as described above is generated.

Further, on the basis of the polarization direction image, an image indicating normal information for each pixel is generated as a polarized image. As is well known, when the received light signal value for light in each of the polarization directions corresponding to 0 degrees, 45 degrees, 90 degrees, 135 degrees, and the like is obtained for each pixel, a sine wave indicating the polarization state can be determined by fitting on the basis of the received light signal value for each polarization direction. Further, such a sine wave indicating the polarization state is determined for each pixel, and by performing a predetermined computation using the maximum value, minimum value, average value, and the like of the sine wave, various types of polarization information can be computed for each pixel.

On the basis of the polarization direction image described above, the polarized image generation section 26 determines the above-described since wave for each pixel and performs the predetermined computation on the basis of the sine wave, to thereby generate a polarized image indicating normal information (normal direction) for each pixel.

In the signal processing section 3D, on the basis of the polarized image generated by the polarized image generation section 26, the ground orientation estimation section 3*b*D estimates the orientation of the ground, and specifically in the present example, computes the representative angle.

FIG. 20 is a block diagram illustrating a configuration example of the ground orientation estimation section 3*b*D.

In comparison, the ground orientation estimation section 3*b*D differs from the ground orientation estimation section 3*b* illustrated in FIG. 7 in that the normal vector computation section 31 is omitted and an angle image generation section 32D is provided instead of the angle image generation section 32.

The angle image generation section 32D generates the above-described angle image on the basis of the polarized image generated by the polarized image generation section 26. The polarized image is an image indicating, for each pixel, normal information, that is, information representing the normal direction, and thus the angle image generation section 32D executes, for each pixel of the polarized image, processing for converting the normal direction into the angle θ to generate an angle image indicating the angle θ for each pixel.

Note that the configuration subsequent to the angle image generation section 32D is similar to that in the case of the ground orientation estimation section 3*b*, the configuration including the binarization processing section 33, the mask section 34, and the representative angle computation section 35, which are used to compute the representative angle on the basis of the angle image. Therefore, the redundant description is omitted.

Note that, in the above-described example, the configuration as a variation using the polarization sensor 25 is applied to the imaging control apparatus 1 as the first embodiment, but that the configuration as the variation can suitably be applied to the imaging control apparatus 1A in the second embodiment and the imaging control apparatus 1B as the preceding apparatus in the third embodiment.

Here, in the above-described examples, a three-dimensional point cloud is generated on the basis of the distance image. However, a three-dimensional point cloud may be generated on the basis of the RGB image. For example, a technique for SEM (Structure from Motion) can be used to generate a three-dimensional point cloud on the basis of the RGB image.

Additionally, a three-dimensional point cloud may be generated using a radar. That is, in the present technology, generation of a three-dimensional point cloud based on the captured image is not essential, and generation of a three-dimensional point cloud is only required to be based on sensing information obtained by sensing the ground side from the air.

Moreover, in the above-described examples, the flying body is described as an example of the mobile body M for moving the imaging control apparatus according to the present technology. However, the mobile body M is not limited to the flying body. For example, by causing a traveling body such as a vehicle which supports a rod-like member (elongate object) to which at least the imaging section 2 (or 2D) is attached at a leading end of the rod-like member to travel, imaging can be performed from a high altitude during movement on the ground side as in the case of the use of the flying object.

Furthermore, in the above-described examples, the orientation of the imaging section 2 (or 2D) is changed to change the imaging direction (sensing direction). However, the orientation of the whole imaging control apparatus 1 (1A) may be changed. Alternatively, in a possible configuration, the imaging direction is changed by controlling the posture of the mobile body M supporting the imaging control apparatus.

5. Conclusion of Embodiments

As described above, the control apparatus as the embodiments (imaging control apparatus 1, 1A, 1B, or 1D) includes a point cloud generation section (three-dimensional point cloud generation section 3*a*) that generates a three-dimensional point cloud indicating a three-dimensional structure of a target zone on the basis of sensing information obtained by sensing a ground side from the air, an estimation section (ground orientation estimation section 3*b* or 3*b*D) that estimates an orientation of the ground on the basis of a captured image obtained by imaging the ground side from the air, and a control section (control section 5, 5A, or 5B) that performs control related to sensing for generation of the three-dimensional point cloud of the target zone on the basis of information regarding the orientation of the ground estimated by the estimation section.

Thus, when the three-dimensional point cloud of the target zone is to be generated on the basis of sensing information targeting the ground, appropriate sensing control corresponding to the orientation of the ground can be performed, for example, sensing is performed in the orientation aligned with the orientation of the ground.

Since sensing can be performed in the appropriate orientation corresponding to the orientation of the ground, the number of samples for sensing information regarding a slope can be increased, enabling an increase in the number of samples for the point cloud. Accordingly, the resolution of the point cloud data can be increased. This in turn enables an increase in the accuracy of three-dimensional surveying in a case where the zone to be surveyed includes a slope.

Additionally, in the control apparatus as the embodiments, the control section performs, as control related to the sensing based on information regarding the orientation of the ground, control for causing execution of sensing in a sensing direction corresponding to the orientation of the ground.

Thus, when the three-dimensional point cloud of the target zone is to be generated on the basis of sensing information targeting the ground, sensing can be performed in the orientation corresponding to the orientation of the ground.

Therefore, the accuracy of three-dimensional surveying can be increased in a case where the zone to be surveyed includes a slope.

Further, in the control apparatus as the embodiments, the control section performs, as control related to the sensing, control for changing the sensing direction to a direction corresponding to the orientation of the ground.

For example, the imaging direction is changed to the direction corresponding to the orientation of the ground by such control as a change in the orientation of the imaging section or in the posture of the mobile body supporting the imaging section.

Thus, the accuracy of three-dimensional surveying can be increased in a case where the zone to be surveyed includes a slope.

Further, in the control apparatus as the embodiments (imaging control apparatus 1), the control section (control section 5) performs, as control for changing the sensing direction, control for changing the sensing direction to a direction at a preset angle (see FIG. 11).

Thus, when sensing for generation of a three-dimensional point cloud is caused to be performed in the sensing direction corresponding to the orientation of the ground, the above-described control eliminates the need to adaptively determine the target angle for the sensing direction according to the orientation of the ground, for example, the angle of the direction directly opposite to the ground.

Therefore, in attempting to increase the accuracy of three-dimensional surveying in a case where the zone to be surveyed includes a slope, it is possible to reduce a processing load.

Additionally, in the control apparatus as the embodiments (imaging control apparatus 1A), the control section (control section 5A) performs, as control for changing the sensing direction, control for changing the sensing direction to a direction indicated by a target angle adaptively determined relative to the orientation of the ground (see FIG. 13).

Thus, a three-dimensional point cloud for a slope is generated on the basis of information obtained by sensing in the sensing direction at the angle adaptively computed for the estimated orientation of the ground, for example, the angle of the direction directly opposite to the orientation of the ground.

Therefore, the accuracy of three-dimensional surveying of the slope can be increased.

Further, in the control apparatus as the embodiments (imaging control apparatus 1 or 1A), for each of sensing execution points for generation of the three-dimensional point cloud, the control section (control section 5 or 5A) causes the estimation section to estimate the orientation of the ground, makes slope determination on the basis of information regarding the estimated orientation of the ground, and in a case of determining that a current one of the sensing execution points is not a slope, waits to reach a next one of the sensing execution points, but in a case of determining that the current one of the sensing execution points is a slope, performs control for causing sensing for generation of the three-dimensional point cloud to be executed in the sensing direction corresponding to the orientation of the ground and waits to reach the next one of the sensing execution points (see FIG. 11 and FIG. 13).

Thus, as in the imaging control apparatuses 1 and 1A described in the first and second embodiments, sensing can be performed on the slope in an appropriate orientation corresponding to the orientation of the ground in association with a case where a surveying form in which imaging for generation of a three-dimensional point cloud is performed at each sensing execution point specified on the target zone At is taken.

Therefore, the accuracy of three-dimensional surveying can be increased in a case where the zone to be surveyed includes a slope.

Further, in the control apparatus as the embodiments (imaging control apparatus 1B), as control related to the sensing, by notifying another apparatus (imaging control apparatus 1C) provided with the point cloud generation section of information regarding the orientation of the ground estimated by the estimation section, the control section (control section 5B) causes the other apparatus to perform sensing in the sensing direction corresponding to the orientation of the ground (see FIG. 17).

This can realize the control apparatus that notifies the other apparatus as a following apparatus of information regarding the orientation of the ground to cause the other apparatus to perform sensing for generation of a three-dimensional point cloud in the sensing direction corresponding to the orientation of the ground, like the imaging control apparatus 1B as a preceding apparatus described in the third embodiment.

Therefore, for three-dimensional surveying performed in a case where the zone to be surveyed includes a slope, the time required for the surveying can be shortened while measurement accuracy is increased.

Additionally, in the control apparatus as the embodiments, the point cloud generation section generates the three-dimensional point cloud on the basis of the sensing information as a distance image.

The distance image means an image indicating information regarding the distance to a subject for each pixel.

By generating a three-dimensional point cloud on the basis of such a distance image, the three-dimensional point cloud can appropriately be generated to allow three-dimensional surveying to appropriately be performed.

Further, in the control apparatus as the embodiments, the estimation section (ground orientation estimation section 3*b*) estimates the orientation of the ground on the basis of the captured image as a distance image.

Thus, generation of a three-dimensional point cloud and estimation of the orientation of the ground can be performed on the basis of a common distance image.

Therefore, only the ranging sensor is required to generate a three-dimensional point cloud while estimating the orientation of the ground, enabling a reduction in the number of components for realizing the three-dimensional surveying according to the present embodiment and allowing for a reduction in costs.

Further, in the control apparatus as the embodiments, the estimation section estimates the orientation of the ground on the basis of the three-dimensional point cloud generated by the point cloud generation section.

This allows common processing for generating a three-dimensional point cloud to be used to obtain point cloud data as three-dimensional surveying data for the target zone and for generating a three-dimensional point cloud to be used to estimate the orientation of the ground.

This enables an increase in the efficiency of processing for realizing generation of point cloud data and estimation of the orientation of the ground.

Additionally, in the control apparatus as the embodiments, the estimation section determines a normal vector for each of positions on the ground on the basis of a positional relation between points adjacent to each other in the three-dimensional point cloud and estimates the orientation of the ground on the basis of the normal vector.

Thus, the orientation of the ground can appropriately be estimated from the three-dimensional point cloud.

Further, in the control apparatus as the embodiments, the estimation section (ground orientation estimation section 3*b*D) estimates the orientation of the ground on the basis of the captured image as a polarized image.

The polarized image means an image indicating information representing the polarization state of incident light for each pixel.

By using such a polarized image to estimate the orientation of the ground, the orientation of the ground can appropriately be estimated.

Further, in the control apparatus as the embodiments, the estimation section generates an angle image indicating an angle at which the ground is oriented for each of pixels on the basis of the captured image, and computes a representative angle indicating a representative orientation of the ground on the basis of the angle in an image region in the angle image in which region the angle is greater than or equal to a predetermined angle threshold.

Thus, on the basis of information regarding the representative angle indicating the representative orientation for the target ground, whether the ground is a slope or not can be determined, and sensing can appropriately be performed in the sensing direction adaptively determined relative to the orientation of the ground.

Therefore, the accuracy of three-dimensional surveying can be increased in a case where the zone to be surveyed includes a slope.

Additionally, in the control apparatus as the embodiments, the estimation section computes the representative angle on the basis of the angle of an image region in the angle image in which region the angle is greater than or equal to the angle threshold and which region has an area greater than or equal to a predetermined area threshold.

Thus, the representative angle can appropriately be computed by removing small regions caused by noise or the like from even image regions having an angle greater than or equal to the angle threshold.

Therefore, for imaging for generation of a three-dimensional point cloud, sensing in the appropriate sensing direction corresponding to the orientation of the ground can be performed, allowing for an increase in the accuracy of three-dimensional surveying of the target zone.

The control method of the embodiments is a control method executed by the signal processing apparatus and including processing of generating a three-dimensional point cloud indicating a three-dimensional structure of a target zone on the basis of sensing information obtained by sensing a ground side from the air, estimating an orientation of the ground on the basis of a captured image obtained by imaging the ground side from the air, and performing control related to sensing for generation of the three-dimensional point cloud of the target zone on the basis of information regarding the estimated orientation of the ground.

Such a control method can produce effects similar to those of the control apparatus as the embodiments described above.

Note that the effects described herein are only illustrative and not restrictive and that any other effects may be produced.

6. Present Technology

The present technology can also adopt the following configurations.

(1)

A control apparatus including:

a point cloud generation section that generates a three-dimensional point cloud indicating a three-dimensional structure of a target zone on the basis of sensing information obtained by sensing a ground side from the air;

an estimation section that estimates an orientation of the ground on the basis of a captured image obtained by imaging the ground side from the air; and a control section that performs control related to sensing for generation of the three-dimensional point cloud of the target zone on the basis of information regarding the orientation of the ground estimated by the estimation section.

(2)

The control apparatus according to (1) above, in which the control section performs, as control related to the sensing based on the information regarding the orientation of the ground, control for causing execution of sensing in a sensing direction corresponding to the orientation of the ground.

(3)

The control apparatus according to (2) above, in which the control section performs, as control related to the sensing, control for changing the sensing direction to a direction corresponding to the orientation of the ground.

(4)

The control apparatus according to (3) above, in which the control section performs, as control for changing the sensing direction, control for changing the sensing direction to a direction at a preset angle.

(5)

The control apparatus according to (3) above, in which the control section performs, as control for changing the sensing direction, control for changing the sensing direction to a direction indicated by a target angle adaptively determined relative to the orientation of the ground.

(6)

The control apparatus according to any of (1) to (5) above, in which, for each of sensing execution points for generation of the three-dimensional point cloud, the control section causes the estimation section to estimate the orientation of the ground, makes slope determination on the basis of information regarding the estimated orientation of the ground, and in a case of determining that a current one of the sensing execution points is not a slope, waits to reach a next one of the sensing execution points, but in a case of determining that the current one of the sensing execution points is a slope, performs control for causing sensing for generation of the three-dimensional point cloud to be executed in a sensing direction corresponding to the orientation of the ground and waits to reach the next one of the sensing execution points.

(7)

The control apparatus according to any of (1) to (5) above, in which, as control related to the sensing, by notifying another apparatus provided with the point cloud generation section of information regarding the orientation of the ground estimated by the estimation section, the control section causes the other apparatus to perform sensing in a sensing direction corresponding to the orientation of the ground.

(8)

The control apparatus according to any of (1) to (7) above, in which the point cloud generation section generates the three-dimensional point cloud on the basis of the sensing information as a distance image.

(9)

The control apparatus according to (8) above, in which the estimation section estimates the orientation of the ground on the basis of the captured image as a distance image.

(10)

The control apparatus according to (9) above, in which the estimation section estimates the orientation of the ground on the basis of the three-dimensional point cloud generated by the point cloud generation section.

(11)

The control apparatus according to (10) above, in which the estimation section determines a normal vector for each of positions on the ground on the basis of a positional relation between points adjacent to each other in the three-dimensional point cloud and estimates the orientation of the ground on the basis of the normal vector.

(12)

The control apparatus according to any of (1) to (7) above, in which the estimation section estimates the orientation of the ground on the basis of the captured image as a polarized image.

(13)

The control apparatus according to any of (1) to (12) above, in which the estimation section generates an angle image indicating an angle at which the ground is oriented for each of pixels, on the basis of the captured image, and computes a representative angle indicating a representative orientation of the ground on the basis of the angle in an image region in the angle image in which region the angle is greater than or equal to a predetermined angle threshold.

(14)

The control apparatus according to (13) above, in which the estimation section computes the representative angle on the basis of the angle of an image region in the angle image in which region the angle is greater than or equal to the angle threshold and which region has an area greater than or equal to a predetermined area threshold.

(15)

A control method executed by a signal processing apparatus, including processing of:

generating a three-dimensional point cloud indicating a three-dimensional structure of a target zone on the basis of sensing information obtained by sensing a ground side from the air;

estimating an orientation of the ground on the basis of a captured image obtained by imaging the ground side from the air; and performing control related to sensing for generation of the three-dimensional point cloud of the target zone on the basis of information regarding the estimated orientation of the ground.

REFERENCE SIGNS LIST

1, 1A, 1B, 1C, 1D: Imaging control apparatus
M: Mobile body
At: Target zone
Pi: Imaging execution point
Rf: Flight route
2, 2D: Imaging section
21: RGB sensor
22: Ranging sensor
23: RGB image generation section
24: Distance image generation section
3, 3D: Signal processing section
3*a*: Three-dimensional point cloud generation section
3*b*, 3*b*D: Ground orientation estimation section
3*c*: Point cloud data generation section
4: Memory section
5, 5A, 5B, 5C: Control section
6: Position sensor
7: Actuator
8: IMU
31: Normal vector computation section
32, 32D: Angle image generation section
33: Binarization processing section
34: Mask section
35: Representative angle computation section
9: Communication section
25: Polarization sensor
26: Polarized image generation section

The invention claimed is:

1. A control apparatus, comprising:

a point cloud generation section that generates a three-dimensional point cloud indicating a three-dimensional structure of a target zone on a basis of sensing information obtained by sensing a ground side from the air;

an estimation section that estimates an orientation of the ground on a basis of a captured image obtained by imaging the ground side from the air; and a control section that performs control related to sensing for the generation of the three-dimensional point cloud of the target zone on a basis of information regarding the orientation of the ground estimated by the estimation section.

2. The control apparatus according to claim 1, wherein the control section performs, as the control related to the sensing based on the information regarding the orientation of the ground, control for causing execution of sensing in a sensing direction corresponding to the orientation of the ground.

3. The control apparatus according to claim 2, wherein the control section performs, as the control related to the sensing, control for changing the sensing direction to a direction corresponding to the orientation of the ground.

4. The control apparatus according to claim 3, wherein the control section performs, as the control for changing the sensing direction, control for changing the sensing direction to a direction at a preset angle.

5. The control apparatus according to claim 3, wherein the control section performs, as the control for changing the sensing direction, control for changing the sensing direction to a direction indicated by a target angle adaptively determined relative to the orientation of the ground.

6. The control apparatus according to claim 1, wherein, for each of sensing execution points for the generation of the three-dimensional point cloud, the control section causes the estimation section to estimate the orientation of the ground, makes slope determination on a basis of the information regarding the estimated orientation of the ground, and in a case of determining that a current one of the sensing execution points is not a slope, waits to reach a next one of the sensing execution points, but in a case of determining that the current one of the sensing execution points is a slope, performs control for causing the sensing for the generation of the three-dimensional point cloud to be executed in a sensing direction corresponding to the orientation of the ground and waits to reach the next one of the sensing execution points.

7. The control apparatus according to claim 1, wherein, as the control related to the sensing, by notifying another apparatus provided with the point cloud generation section of the information regarding the orientation of the ground estimated by the estimation section, the control section causes the other apparatus to perform sensing in a sensing direction corresponding to the orientation of the ground.

8. The control apparatus according to claim 1, wherein the point cloud generation section generates the three-dimensional point cloud on the basis of the sensing information as a distance image.

9. The control apparatus according to claim 8, wherein the estimation section estimates the orientation of the ground on the basis of the captured image as a distance image.

10. The control apparatus according to claim 9, wherein the estimation section estimates the orientation of the ground on a basis of the three-dimensional point cloud generated by the point cloud generation section.

11. The control apparatus according to claim 10, wherein the estimation section determines a normal vector for each of positions on the ground on a basis of a positional relation between points adjacent to each other in the three-dimensional point cloud and estimates the orientation of the ground on a basis of the normal vector.

12. The control apparatus according to claim 1, wherein the estimation section estimates the orientation of the ground on the basis of the captured image as a polarized image.

13. The control apparatus according to claim 1, wherein the estimation section generates an angle image indicating an angle at which the ground is oriented for each of pixels, on the basis of the captured image, and computes a representative angle indicating a representative orientation of the ground on a basis of the angle in an image region in the angle image in which region the angle is greater than or equal to a predetermined angle threshold.

14. The control apparatus according to claim 13, wherein the estimation section computes the representative angle on the basis of the angle of the image region in the angle image in which region the angle is greater than or equal to the predetermined angle threshold and which region has an area greater than or equal to a predetermined area threshold.

15. A control method executed by a signal processing apparatus, comprising:

generating a three-dimensional point cloud indicating a three-dimensional structure of a target zone on a basis of sensing information obtained by sensing a ground side from the air;

estimating an orientation of the ground on a basis of a captured image obtained by imaging the ground side from the air; and performing control related to sensing for the generation of the three-dimensional point cloud of the target zone on a basis of information regarding the estimated orientation of the ground.

* * * * *